United States Patent
Brooks

(10) Patent No.: US 11,771,220 B1
(45) Date of Patent: Oct. 3, 2023

(54) CONFIGURATION AND CONTROL OF MOVEABLE SHELF SYSTEMS

(71) Applicant: Elevator Shelf, Inc., San Diego, CA (US)

(72) Inventor: Neil Brooks, San Diego, CA (US)

(73) Assignee: Elevator Shelf, Inc., San Diego, CA (US)

( * ) Notice: Subject to any disclaimer, the term of this patent is extended or adjusted under 35 U.S.C. 154(b) by 0 days.

(21) Appl. No.: 17/691,686

(22) Filed: Mar. 10, 2022

(51) Int. Cl.
A47B 51/00 (2006.01)
A47B 57/06 (2006.01)
G05B 19/4155 (2006.01)

(52) U.S. Cl.
CPC .............. *A47B 51/00* (2013.01); *A47B 57/06* (2013.01); *G05B 19/4155* (2013.01); *A47B 2051/005* (2013.01); *A47B 2220/0013* (2013.01); *G05B 2219/33114* (2013.01)

(58) Field of Classification Search
CPC .............. A47B 51/00; A47B 2051/005; A47B 2220/0013; A47B 2220/0002; A47B 2005/003; A47B 46/00; A47B 46/005; A47B 57/06
See application file for complete search history.

(56) References Cited

U.S. PATENT DOCUMENTS

| 2,735,579 | A |   | 2/1956 | Wynn et al. |  |
|---|---|---|---|---|---|
| 2,905,517 | A |   | 9/1959 | Mead |  |
| 5,535,852 | A | * | 7/1996 | Bishop | B66B 9/00 |
|   |   |   |   |   | 312/247 |
| 5,667,035 | A | * | 9/1997 | Hughes | B66F 7/02 |
|   |   |   |   |   | 182/142 |
| 6,336,692 | B1 |   | 1/2002 | Snyder |  |
| 7,963,505 | B2 | * | 6/2011 | Taylor | B66D 1/26 |
|   |   |   |   |   | 248/329 |
| 8,414,093 | B2 |   | 4/2013 | Moran |  |
| 8,424,983 | B1 |   | 4/2013 | Strauss |  |

(Continued)

FOREIGN PATENT DOCUMENTS

| WO | WO-2014185040 A1 | * | 11/2014 | ............. A47B 51/00 |
| WO | WO-2019197641 A1 | * | 10/2019 | ............. A47C 17/84 |

OTHER PUBLICATIONS

Granberg US, Inc.; "Lifts for Wall Cabinet"; https://www.granbergusa.com/our-products/accessible-kitchens/lifts-for-wall-cabinet/; downloaded Mar. 29, 2022; Oct. 2020; 4 pgs.

(Continued)

*Primary Examiner* — Andrew M Roersma
(74) *Attorney, Agent, or Firm* — Fitch, Even, Tabin & Flannery LLP

(57) ABSTRACT

The techniques and systems (e.g., elevator shelf systems) for efficient shelving and item storage are described. For instance, one or more aspects of the described example shelving systems may provide for more compact and more stable shelving systems (e.g., saving more space cabinets for storage rather than shelving operating mechanisms, providing more stability against lateral and in/out swings during descent and ascent, providing capabilities of handling shelving loads up to 30 kg, etc.). One or more inventive aspects of the techniques and systems described herein include the efficient integration and configuration of drawer slides (e.g., for in/out shelf motion), as well as the efficient integration and configuration of a belt and reel system (e.g., for up/down shelf motion).

10 Claims, 24 Drawing Sheets

(56) References Cited

U.S. PATENT DOCUMENTS

| | | | |
|---|---|---|---|
| 9,872,561 B1* | 1/2018 | Alfaro | A47B 88/457 |
| 2006/0066188 A1* | 3/2006 | Crawford | A47B 51/00 |
| | | | 312/247 |
| 2014/0252930 A1* | 9/2014 | Reid | A47B 46/005 |
| | | | 312/247 |
| 2016/0135593 A1* | 5/2016 | DeLorean | E04B 1/941 |
| | | | 312/247 |
| 2016/0278517 A1* | 9/2016 | DeLorean | F24F 7/007 |
| 2017/0224105 A1* | 8/2017 | Klooth | A47B 51/00 |

OTHER PUBLICATIONS

Touchstone Home Products, Inc.; "Drop Down TV Lift Mechanisms"; https://www.touchstonehomeproducts.com/collections/drop-down-tv-lift-mechanisms; downloaded Mar. 29, 2022; Jan. 26, 2019; 5 pgs.

* cited by examiner

CONFIGURATION AND CONTROL OF MOVEABLE SHELF SYSTEMS

BACKGROUND OF THE INVENTION

1. Field of the Invention

The present invention relates generally to shelf systems, and more specifically to configuration and control of moveable shelf systems.

2. Discussion of the Related Art

Various systems and processes are known in the art for configuration and control of moveable shelf systems.

Generally, a shelf may refer to a flat, horizontal plane used for displaying or storing items in a home, business, store, or elsewhere. In some cases, shelves may be raised off the floor (e.g., and may be anchored to a wall). Some shelves may be supported from its sides by brackets, or otherwise anchored to cabinetry by brackets, dowels, screws, nails, etc.

In some cases (e.g., for average height individuals), top shelves in kitchen cabinets are not accessible without the aid of a step ladder. A push-button controlled system for sliding the top shelf out of the cabinet and lowering it onto the countertop would make these hard-to-reach shelves of far greater utility, especially if the system could handle heavy objects as well as light ones. Conventional systems attempting to achieve such objectives are deficient (e.g., as conventional systems may be expensive, ineffective or inefficient, unable to be exploited commercially, etc.).

SUMMARY

An apparatus, system, and method for configuration and control of shelf systems moveable only in the vertical direction are described. One or more aspects of the apparatus, system, and method include a control board assembly mounted to a horizontal support structure and comprising a control board housing; at least four reels housed by the control board housing and rigidly attached to substantially horizontal axles which rotate in bearings, wherein a first pair of reels is mounted such as to rotate around parallel axes and a second pair of reels is mounted such as to rotate around axes perpendicular to the axles of the first pair; a drive motor mounted to the control board housing and configured for simultaneous rotation of the at least four reels by turning the axles to which the reels are fixed; a microprocessor mounted to the control board housing; a solenoid latch mounted to the control board housing and controlled by the microprocessor such that when the latch engages teeth of a gear fixed to one axle, all axles are locked, whereby downward motion of the shelf is prevented when electrical power to the drive motor is absent; a plurality of relays; a speed controller mounted to the control board housing and controlled by the microprocessor and wherein an output of the speed controller is connected to the drive motor; and a fuse box mounted to the control board housing. One or more aspects of the apparatus, system, and method further include a moveable shelf hanging below the control board assembly from four belts wherein a first end of each belt is wrapped around one reel and a second end of each belt is coupled to the moveable shelf, whereby the reels' rotational axes result in a first pair of belts coupled to the first pair of reels being orthogonal to a second pair of belts coupled to the second pair of reels, whereby the orthogonal planes of the belts inhibit swaying of the shelf in the fore, aft, left, and right directions when the shelf is moved vertically, wherein the system is further configured to translate the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop mechanism contains a spring stiffer than a spring in an up limit switch. The up limit switch mounted to an anti-sway bar attached to the control board and in communication with the microprocessor such that a status of the up limit switch is sensed by the microprocessor and contact of the up limit switch with the compressible stop mechanism causes the moveable shelf to stop at the upper position. One or more aspects of the apparatus, system, and method further includes a down limit switch mounted to an underside of the moveable shelf and in communication with the microprocessor such that a status of the down limit switch is sensed by the microcontroller. One or more aspects of the apparatus, system, and method further include a variable length electrical connection permitting the continuous communication between the microprocessor on the control board and the down limit switch on the moving shelf, whereby the moveable shelf stops at the lower position in response to closure of the down limit switch at the lower position, wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion. One or more aspects of the apparatus, system, and method further include at least one additional variable length electrical connection, utilizing the same multi-wire ribbon cable as the down limit switch, between an ultrasonic sensor mounted on the underside of the moveable shelf and the microprocessor on the control board wherein the ultrasonic sensor is configured to measure the distance between shelf and a countertop located below the shelf at regular fixed time intervals and, thereby, provides a real time monitor of vertical velocity with which the microcontroller can exercise feedback control of the acceleration of the shelf up to a target cruising velocity and deceleration back to rest as the shelf approaches a lower or upper terminus of its vertical trajectory. One or more aspects of the apparatus, system, and method include a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position, depression of the push button switch causes the shelf to descend to the lower position, and when the shelf is in the lower position, depression of the push button switch causes the shelf to ascend to the upper position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

An apparatus, system, and method for configuration and control of shelf systems moveable only in the vertical direction are described. One or more aspects of the apparatus, system, and method include a control board assembly mounted to a slanted support structure and comprising: a control board housing; four or more reels contained in the control board housing and attached to substantially horizontal and parallel axles which rotate in bearings; a drive motor mounted to the control board housing and configured for simultaneous rotation of the four or more reels by turning the axles to which the reels are fixed; a microprocessor mounted to the control board housing; a solenoid latch mounted to the control board housing and controlled by the microprocessor such that when the latch engages teeth of a gear fixed to one axle, both parallel axles are locked, whereby downward motion of the shelf is prevented when electrical power to the drive motor is absent; a plurality of relays; a speed controller mounted to the control board housing and controlled by the microprocessor and wherein an output of the speed controller is connected to the drive motor; and a fuse box mounted to the control board housing. One or more aspects of the apparatus, system, and method further include a moveable shelf hanging below the control board assembly from four coplanar belts wherein the system is further configured to move the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop mechanism contains a spring stiffer than a spring in an up limit switch. One or more aspects of the apparatus, system, and method further include the up limit switch mounted to the control board and in communication with the microprocessor such that a status of the up limit switch is sensed by the microprocessor and contact of the up limit switch with the compressible stop mechanism causes the moveable shelf to stop at the upper position. One or more aspects of the apparatus, system, and method further include a down limit switch mounted to an underside of the moveable shelf and in communication with the microprocessor such that a status of the down limit switch is sensed by the microcontroller. One or more aspects of the apparatus, system, and method further include a variable length electrical connection permitting the continuous communication between the microprocessor on the control board and the down limit switch on the moving shelf, whereby the moveable shelf stops at the lower position in response to closure of the down limit switch at the lower position, wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion. One or more aspects of the apparatus, system, and method further include at least one additional variable length electrical connection, utilizing the same multi-wire ribbon cable as the down limit switch, between an ultrasonic sensor mounted on the underside of the moveable shelf and the microprocessor on the control board, wherein the ultrasonic sensor is configured to measure the distance between shelf and a countertop located below the shelf at regular fixed time intervals and, thereby, provides a real time monitor of vertical velocity with which the microcontroller can exercise feedback control of the acceleration of the shelf up to a target cruising velocity and deceleration back to rest as the shelf approaches a lower or upper terminus of its vertical trajectory. One or more aspects of the apparatus, system, and method further include a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position, depression of the push button switch causes the shelf to descend to the lower position, and when the shelf is in the lower position, depression of the push button switch causes the shelf to ascend to the upper position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

An apparatus, system, and method for configuration and control of shelf systems moveable in both the horizontal and vertical directions are described. One or more aspects of the apparatus, system, and method include a control board assembly mounted to an interior of a cabinet via drawer slides such that the control board assembly is moveable horizontally from a first horizontal position inside the cabinet and a second horizontal position outside the cabinet, and comprising: a control board housing comprising a box with a height less than 3 inches and a width and depth comparable with a moveable shelf hanging from the control board housing; four or more reels inside the control board housing and rigidly attached to substantially horizontal axles which rotate in bearings, wherein a first pair of reels is mounted such as to rotate around parallel axes and the second pair of reels is mounted such as to rotate around axes perpendicular to the axles of the first pair; a drive motor mounted to the control board housing and configured for simultaneous rotation of the four reels by turning the axles to which the reels are fixed; a microprocessor mounted to the control board housing; a solenoid latch mounted to the control board housing and controlled by the microprocessor such that when the latch engages teeth of a gear fixed to one axle, the axle is locked, whereby downward motion of the shelf is prevented when electrical power to the drive motor is absent; a plurality of relays; a speed controller mounted to the control board housing and controlled by the microprocessor and wherein an output of the speed controller is connected to the drive motor; a fuse box mounted to the control board housing; a second motor mounted to the control board housing and coupled to a means for horizontal movement, wherein the second motor is configured to drive the control board housing between the first horizontal position and the second horizontal position. One or more aspects of the apparatus, system, and method further include the moveable shelf hanging below the control board assembly, from each of the four or more belts wherein a first end of each belt is wrapped around one reel and a second end of each belt is coupled to the moveable shelf, whereby the reel rotational axes result in a first pair of belts coupled to the first pair of reels being orthogonal to a second pair of belts coupled to the second pair of reels, whereby the orthogonal planes of the belts inhibit swaying of the shelf in the fore, aft, left, and right positions when the shelf is moved vertically, wherein the system is further configured to move the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop contains a spring stiffer than a spring in an up limit switch, the moveable shelf further comprising a fence on the sides and back of the moveable shelf. One or more aspects of the apparatus, system, and method further include a hinged lightweight horizontal roof mounted to the belts at a location above the moveable shelf configured to show a safe vertical height of loaded objects between the moveable shelf and the control board housing when the moveable shelf is in the upper position. One or more aspects of the apparatus, system, and method further include an anti-sway rod coupled to the control board housing and extending downward from the control board housing, wherein when the moveable shelf is in the upper position a lower end of the anti-sway rod is removably receivable by a receptacle coupled to an upper surface of the moveable shelf, whereby when the moveable shelf is in the upper position the anti-sway rod is received in the receptacle, whereby a rigid connection is formed between the control board housing and the moveable shelf that prevents in/out rocking of the shelf caused by horizontal movement of the control board, wherein during descent of the moveable shelf the anti-sway rod automatically detaches from the receptacle, whereby the anti-sway rod is detached from the moveable shelf. One or more aspects of the apparatus, system, and method further include the up limit switch mounted to the control board and in communication with the microprocessor such that a status of the up limit switch is sensed by the microprocessor and contact of the up limit switch with the compressible stop mechanism causes the moveable shelf to stop at the upper position. One or more aspects of the apparatus, system, and method further include a down limit switch mounted to an underside of the moveable shelf and in communication with the microprocessor such that a status of the down limit switch is sensed by the microcontroller. One or more aspects of the apparatus, system, and method further include a variable length electrical connection permitting the continuous communication between the microprocessor on the control board and the down limit switch on the moving shelf, whereby the moveable shelf stops at the lower position in response to closure of the down limit switch at the lower position, wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion. One or more aspects of the apparatus, system, and method further include at least one additional variable length electrical connection, utilizing the same multi-wire ribbon cable as the down limit switch, between an ultrasonic sensor mounted on the underside of the moveable shelf and the microprocessor on the control board, wherein the ultrasonic sensor is configured to measure the distance between shelf and a countertop located below the shelf at regular fixed time intervals and, thereby, provides a real time monitor of vertical velocity with which the microcontroller can exercise feedback control of the acceleration of the shelf up to a target cruising velocity and deceleration back to rest as the shelf approaches a lower or upper terminus of its vertical trajectory. One or more aspects of the apparatus, system, and method further include a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position and inside the cabinet, depression of the push button switch causes the shelf to first move horizontally outward to the second horizontal position and then descend to the lower position, and when the shelf is in the lower position, depression of the push button switch causes the shelf to first ascend to the upper position and then move inward to the first horizontal position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

A method, apparatus, non-transitory computer readable medium, and system for configuration and control of moveable shelf systems are described. One or more aspects of the method, apparatus, non-transitory computer readable medium, and system include depressing a momentary push-button switch to trigger a microprocessor to perform, on the basis of a program stored in a memory of the microprocessor, control functions to control a plurality of sequential, interleaved actuations of a plurality of motors, perform assorted safety checks, read sensory input, and give commands to relays and to a speed controller for actuation of the plurality of motors and a solenoid latch; determining a current position of the moveable shelf in response to the depressing of the momentary push-button switch, wherein the current position is one of an upper position and a lower position; operating the drive motor to move the moveable shelf from the upper position towards the lower position under feedback control of velocity by an ultrasonic sensor upon determining that no obstacles are detected; shutting off power to the drive motor moving the moveable shelf upon detecting closing of a down limit switch at the lower position; operating the drive motor to move the moveable shelf from the lower position towards the upper position under feedback control of velocity by the ultrasonic sensor, wherein the drive motor is operated in response to the depressing of the momentary push-button switch and upon determining from the status of the down limit switch that the current position is the lower position; and shutting off power to the drive motor upon detecting closing of the up limit switch at the upper position.

Method, apparatus, non-transitory computer readable medium, and system for configuration and control of moveable shelf systems are described. One or more aspects of the method, apparatus, non-transitory computer readable medium, and system include depressing a momentary push-button switch to trigger a microprocessor to perform, on the basis of a program stored in a memory of the microprocessor, control functions to control a plurality of sequential, interleaved actuations of a plurality of motors, perform assorted safety checks, read sensory input, and give commands to relays and to a speed controller for actuation of the plurality of motors and a solenoid latch; determining a current position of the moveable shelf in response to the depressing of the momentary push-button switch, wherein the current position is one of an upper position located inside a cabinet and a lower position located outside the cabinet; employing an image comparator in communication with the microprocessor to determine that no obstacles lie on a countertop that would prevent the shelf from moving from the upper position to the lower position, wherein the image comparator is employed in response to the depressing of the momentary push-button switch and upon determining from a status of an up limit switch that the current position is the upper position; providing an audible alert and exiting the method in response to detecting an obstacle; determining whether doors of the cabinet are in a 90 degree open position upon determining that no obstacles are detected, wherein the determining includes checking a status of a door limit switch for each door; providing an audible alert and exiting the method in response to determining that the doors of the cabinet are not in the 90 degree open position; operating an in/out motor of the plurality of motors to move the moveable shelf horizontally from the upper position inside the cabinet to an upper outside position located outside the cabinet upon determining the doors are in the 90 degree open position; shutting off power to the in/out motor upon detecting closing of an out limit switch at the upper outside position; energizing of an up/down motor of the plurality of motors to move the moveable shelf in the upward direction, whereby a compressible stop mechanism coupled to the moveable shelf enables upward movement beyond a normal upper limit triggered by the up limit switch, whereby weight of the moveable shelf is removed from the solenoid latch such that the solenoid latch can move freely; unlocking of the solenoid latch; operating the up/down motor to move the moveable shelf from the upper outside position towards the lower position under feedback control of velocity by an ultrasonic sensor; shutting off power to the up/down motor upon detecting closing of a down limit switch at the lower outside position; determining whether the doors of the cabinet are in the 90 degree open position, wherein the determining includes checking the status of the door limit switch for each door, wherein whether the doors of the cabinet are in the 90 degree open position is determined in response to the depressing of the momentary push-button switch and upon determining from a status of a down limit switch that the current position is the lower outside position; moving the moveable shelf vertically from the lower position towards the upper outside position under feedback control of velocity by the ultrasonic sensor upon determining the doors are in the open position; and shutting off power to the up/down motor and energizing the in/out motor to move the moveable shelf horizontally from the upper outside position to the upper inside position upon closure of the up limit switch at the upper outside position.

DETAILED DESCRIPTION

Figure 1:
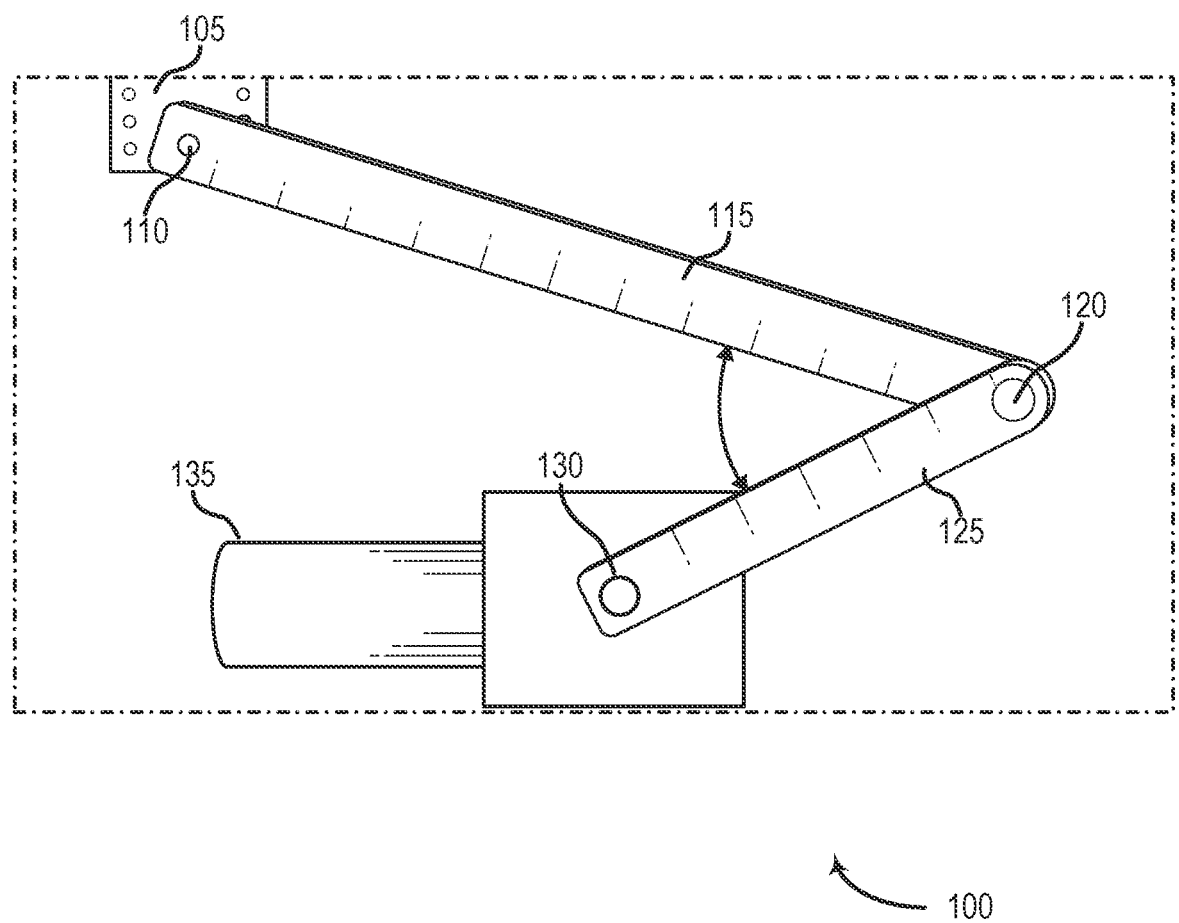
FIG. 1 shows an example of a perspective view of a folded arm assembly for an in/out drive mechanism according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In some cases (e.g., for average height individuals), top shelves in kitchen cabinets are not accessible without the aid of a step ladder. A push-button controlled system for sliding the top shelf out of the cabinet and lowering it onto the countertop would make these hard-to-reach shelves of far greater utility, especially if the system could handle heavy objects as well as light ones. Conventional systems attempting to achieve such objectives are deficient (e.g., as conventional systems may be expensive, ineffective or inefficient, unable to be exploited commercially, etc.).

The techniques and systems (e.g., elevator shelf systems) described herein may provide for more efficient shelving compared to such conventional techniques. For instance, one or more aspects of the described example shelving systems may provide for more compact and more stable shelving systems (e.g., saving more space cabinets for storage rather than shelving operating mechanisms, providing more stability against lateral and in/out swings during descent and ascent, providing capabilities of handling shelving loads up to 30 kg, etc.).

Further, in some examples, shelving systems may be designed to incorporate sensors and electronic controls for efficient (e.g., foolproof) operation of shelving systems. For example, shelving systems may check or confirm whether cabinet doors are fully open, check the proximity of the countertop from a shelving component to guarantee a soft landing, detect potential obstacles on the countertop that may block a shelving component from operating correctly (e.g., obstacles that may prevent a shelf from descending fully onto a countertop), check the height of objects loaded on the shelving system (e.g., check the height of objects on a shelf to prevent a potential collision during shelf ascent), etc.

Such shelving systems may provide more user utility and may be more efficiently integrated (e.g., installed) into new and existing housing structures (e.g., compared to conventional shelving systems). For instance, in some aspects, shelving systems described herein may be powered from housing electricity (e.g., wall alternating current (AC)) or a battery. Further, shelving systems described herein may have efficient design aspects including reduced weight (e.g., shelving system components weighing less than 5 kg), which may reduce shipping costs of shelving systems, provide for easier technician handling and installation, etc.

FIG. 1 shows an example of a top view of a folded arm assembly 100 for an in/out drive mechanism according to aspects of the present disclosure.

One or more inventive aspects of the techniques and systems described herein include the efficient integration and configuration of drawer slides (e.g., for in/out shelf motion), as well as the efficient integration and configuration of a belt and reel system (e.g., for up/down shelf motion). For instance, FIG. 1 illustrates aspects of the in/out motion of a board-mounted drive mechanism that can be controlled by motor 135 (e.g., a worm gear motor 135, etc.) driving a folding arm (e.g., including first arm 115 and second arm 125) which pivots via pivot pin 110 mounted off the back wall or the ceiling of a cabinet (e.g., via engaging pivot pin 110 with bracket 105, which may be mounted off a back wall of a cabinet or a ceiling of a cabinet). In some aspects, pivot pin 110 may fix the folding arm (e.g., first arm 115 of the folding arm) to the wall or ceiling of the cabinet via bracket 105, which may be positioned near a side wall of the cabinet (e.g., rather than the center of the cabinet).

Accordingly, an example of a drive mechanism for in/out motion of a shelving system may include folding arms (first arm 115 and second arm 125, connected via joining pin 120) that may be driven by motor 135. In some examples, drive shaft 130 of motor 135 may be left/right centered on the shelf (e.g., centered with respect to pivot pin 110 and joining pin 120).

In some examples, first arm 115 and second arm 125 may have an approximate 2:1 ratio in arm lengths. For instance, an in/out stroke performable by a shelving system may depend on the lengths of first arm 115 and second arm 125, as well as the interior angle maintained between first arm 115 and second arm 125. As an example, some shelving systems may obtain a 12 inch stroke by transitioning back and forth between a first (e.g., closed) interior angle (e.g., of approximately 45 degrees) and a second (e.g., open) interior angle (e.g., of roughly 90 degrees) between pivot points of an 18 inch first arm 115 and a 9 inch second arm 125.

In one aspect, folded arm assembly 100 includes bracket 105, pivot pin 110, first arm 115, joining pin 120, second arm 125, drive shaft 130, and motor 135.

According to some aspects, motor 135 translates the moveable shelf horizontally from the upper position inside the cabinet to an upper outside position located outside the cabinet upon determining the doors are in the 90 degree open position.

Limit switches (e.g., first limit switch 620 and second limit switch 625) define the range of the in/out motion. The IN limit switch is mounted at the back of the support board; the OUT limit switch is positioned on top of the box covering the motor board and is actuated by the motion of the pin joining the two arms. The limit switches are mounted in series with the motor power to disable motion at the two extremes of the horizontal range of movement.

Figure 2:
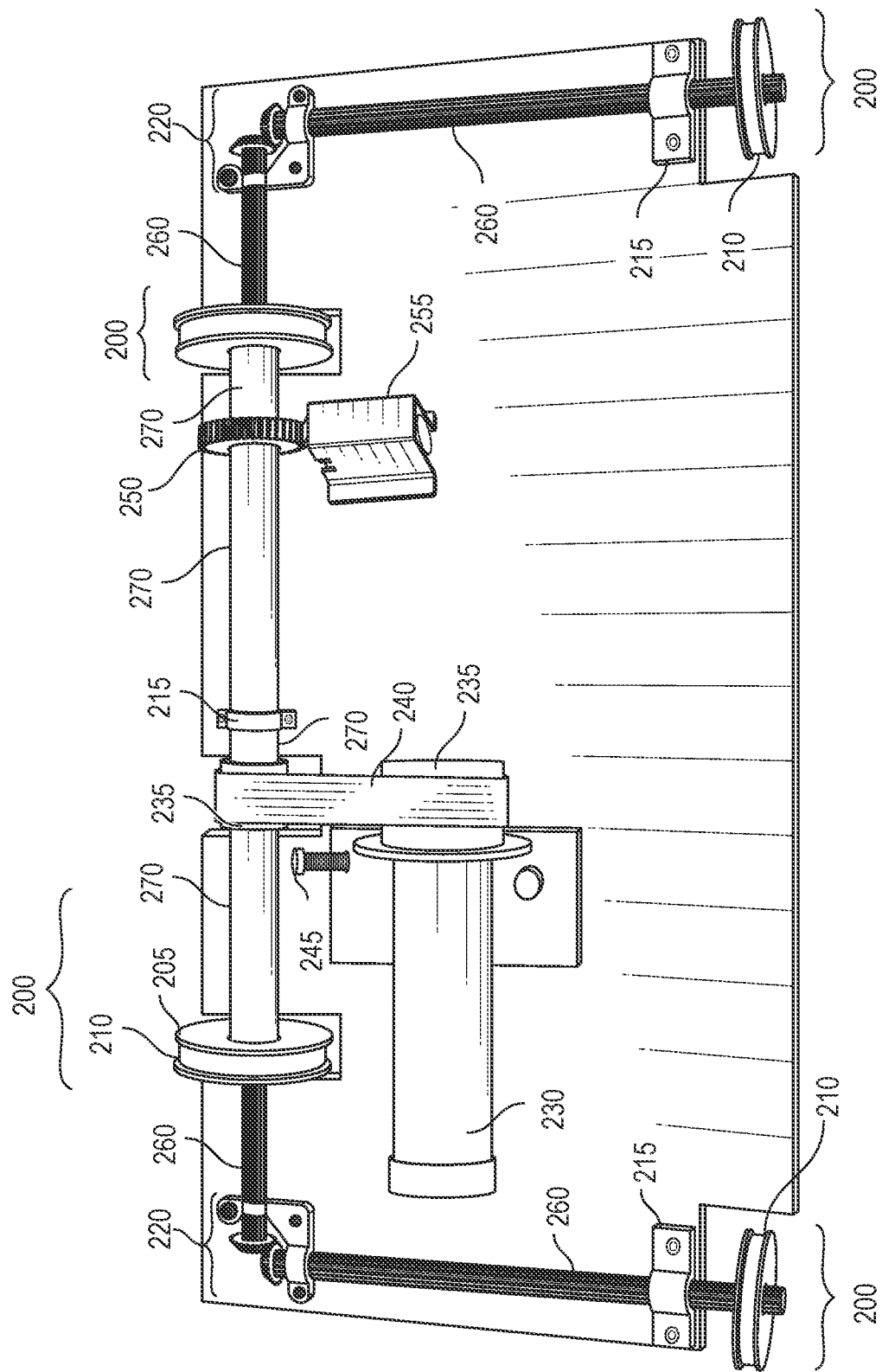
FIG. 2 shows an example of a vertical drive mechanism according to aspects of the present disclosure.

FIG. 2 shows an example of a vertical drive mechanism according to aspects of the present disclosure. The example shown includes four reel and belt units 200 (e.g., where each reel and belt unit 200 includes a reel 205 and a belt 210), three bearings 215, two gear boxes 220 (e.g., two 90 degree gear boxes), gear reducing motor 230, two pulleys 235, ribbed belt 240, tensioning adjustment 245, gear 250, solenoid door latch 255, a plurality of rotary axles 260, and PVC pipe sections 270 employed as spacers.

For instance, in the example of FIG. 2, a vertical drive mechanism may include four reels 205 with belts 210 (e.g., flat belts 210, such as flat polypropylene plastic strapping or belts 210 of other suitable material), three axles 260, two gear boxes 220 and a belt-coupled drive motor 230. In the embodiment shown in FIG. 2, the rotary axles 260 have a hexagonal cross-section.

Such components may be supported, for example, on a rectangular wooden board with angle aluminum lengths screwed to each side. The reel and belt units 200 on the back of the shelf may be mounted with the plane of the belts 210 parallel to the back wall of the cabinet; the reel and belt units 200 on the sides, near the front corners of the shelf, may be mounted with the belts 210 perpendicular to the back wall. Due to belts 210 (e.g., flat belts 210) being rigid with respect to motion parallel to the width of the belt 210, the back reel and belt units 200 may resist swinging of shelving unit components (e.g., a shelf) in the left/right lateral direction and the front reel and belt units 200 may resist swinging of shelving unit components (e.g., a shelf) in front/back lateral direction (e.g., the left/right lateral direction being perpendicular to the front/back lateral direction on a plane parallel to the surface of the floor or the wooden board).

Figure 4:
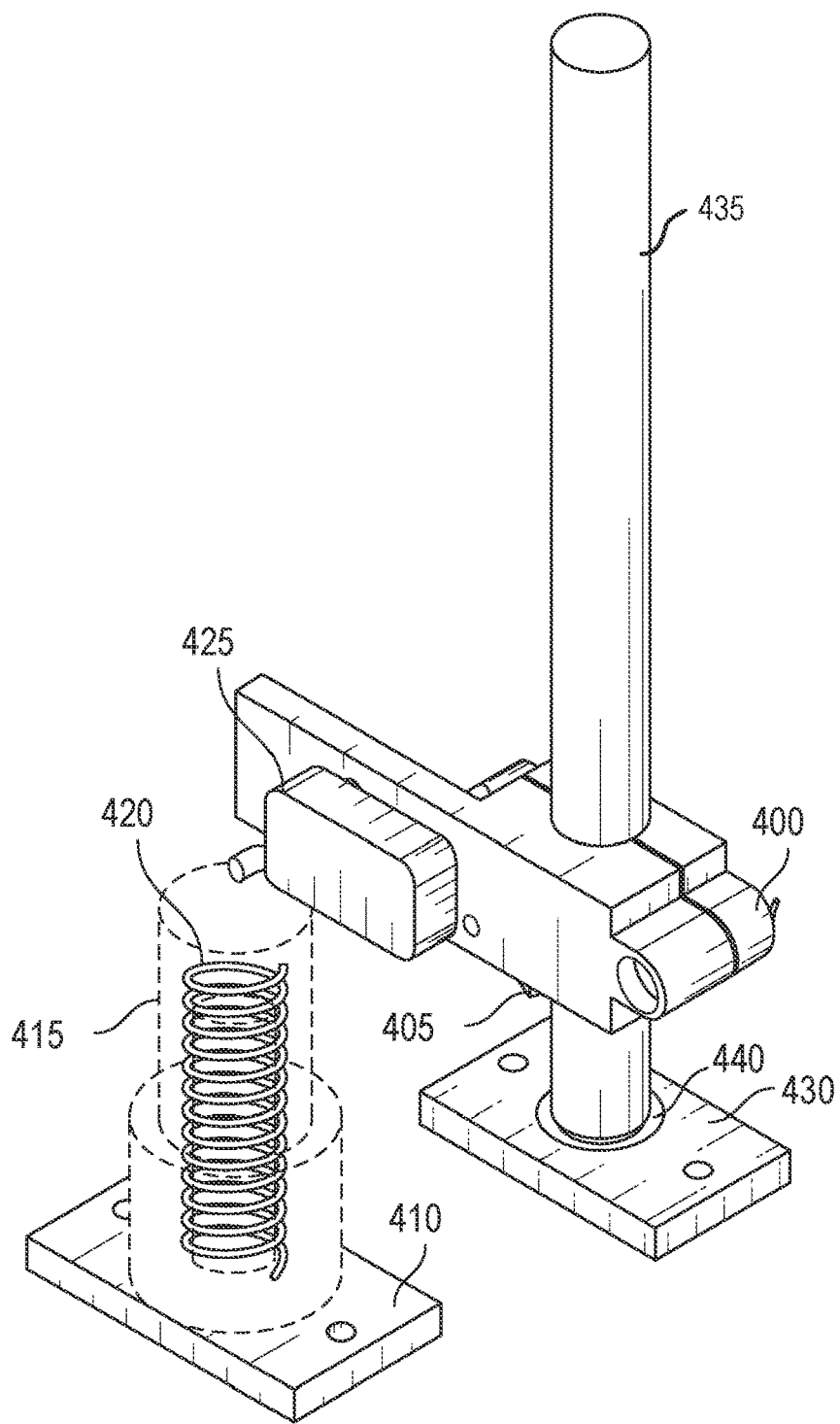
FIG. 4 shows an example of a compressible limit switch actuator diagram according to aspects of the present disclosure.

Moreover, in some examples, to stabilize a shelf against swinging induced by the commencement of in/out motion, a rigid alignment rod (from which the shelf disengages when it is lowered) may be mounted between the motor board and the shelf, as shown in FIG. 4. To self-align the alignment rod with its socket on the shelf as the shelf is raised, the entrance to the cylindrical socket is tapered. Such alignment rod configuration may reduce or eliminate potential back and forth sway during in/out motion and may also serve to prevent other swinging of the shelf (e.g., such as during earthquakes). In some examples, each belt 210 may be driven by an individual motor. In other examples, all four belts 210 may be driven by a single motor (e.g., such as a direct current (DC) motor mounted on one side of the wooden board). Further, the reels 205 may have a hex bore constraining them to rotate with the hex cross section axle. In some examples, a cylindrical plastic collar with a gap in its circumference may prevent belts 210 from jumping off corresponding reels 205.

Figure 3:
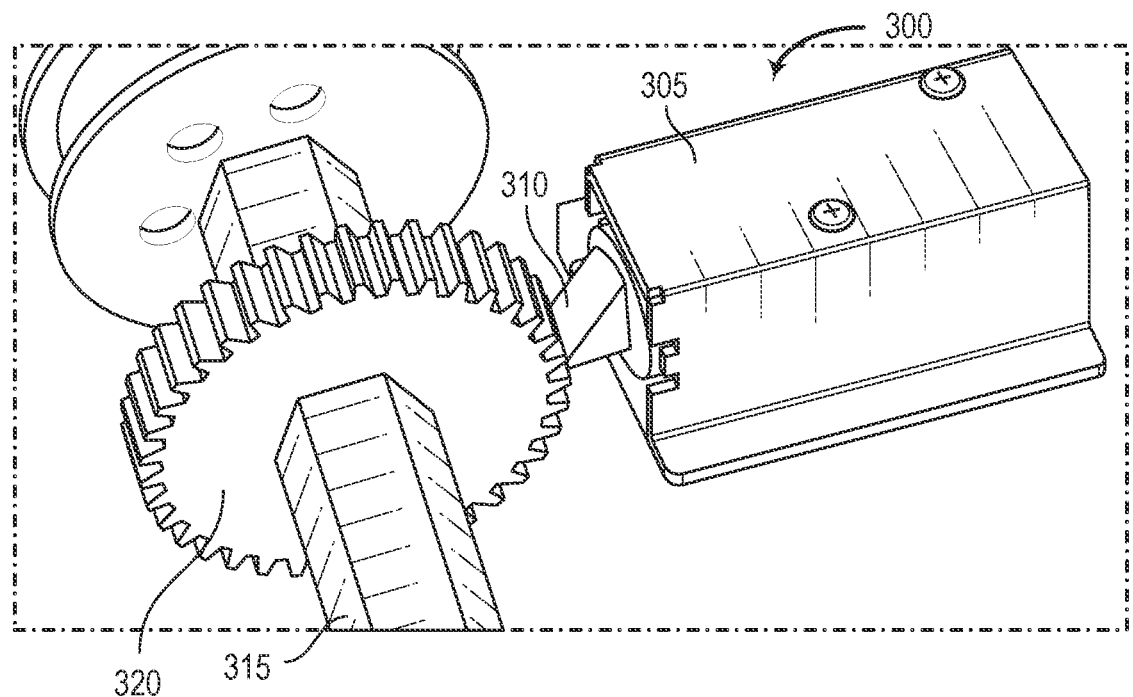
FIG. 3 shows an example of an axle lock mechanism according to aspects of the present disclosure.

In some examples (e.g., aspects of which are also shown in FIG. 3), to lock a shelf in a storage position when the up/down motor is de-energized, solenoid door latch 255 engages the gap between successive teeth of gear 250 on rotary axle 260. For descent of the shelf, solenoid door latch 255 disengages from the teeth of gear 250 (e.g., via microprocessor control).

A microprocessor (e.g., or a processor) is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some examples, to prevent jamming of solenoid door latch 255 under the load exerted by the weight of a loaded shelf, a microprocessor may be programmed to initiate brief upward motion. With the downward load counteracted by the upward drive of the motor, the solenoid door latch 255 is energized and then the direction of the motor is reversed to lower the shelf.

In one aspect, reel and belt unit 200 includes reel 205 and belt 210. Belt 210 is an example of, or includes aspects of, the corresponding element described with reference to FIGS. 15-20. Gear 250 is an example of, or includes aspects of, the corresponding element described with reference to FIG. 3. Solenoid door latch 255 is an example of, or includes aspects of, the corresponding element described with reference to FIG. 3. Rotary axle 260 is an example of, or includes aspects of, the corresponding element described with reference to FIG. 3.

FIG. 3 shows an example of an axle lock mechanism according to aspects of the present disclosure. The example shown includes solenoid door latch 300, rotary axle 315, and gear 320.

Specifically, FIG. 3 illustrates aspects of a solenoid 305-actuated door latch 310 (e.g., solenoid door latch 300) engaging the teeth of a gear 320 co-rotating with a drive axle. For example, to lock a shelf in a storage position when the up/down motor is de-energized, solenoid 305 engages latch 310 (e.g., a spring-actuated latch 310) with the gap between successive teeth of gear 320 (e.g., a hex-bore gear 320) on rotary axle 315. For descent of the shelf, solenoid 305 withdraws latch 310 from the gear 320 teeth under microprocessor control.

Solenoid door latch 300 is an example of, or includes aspects of, the corresponding element described with reference to FIG. 2. In one aspect, solenoid door latch 300 includes solenoid 305 and latch 310. Rotary axle 315 is an example of, or includes aspects of, the corresponding element described with reference to FIG. 2. Gear 320 is an example of, or includes aspects of, the corresponding element described with reference to FIG. 2.

FIG. 4 shows an example of a limit switch actuator diagram according to aspects of the present disclosure. The example shown includes bracket cover plate 400, limit switch support bracket 405, plunger body 410, plunger 415, spring 420, limit switch 425, anti-sway rod receptacle 430, anti-sway rod 435, and tapered hole 440.

FIG. 4 illustrates detailed aspects of an anti-sway rod 435, receptacle 430 with tapered hole 440, DOWN limit switch 425, and compressible stop, the latter of which permits upward travel of the shelf beyond the height at which the limit switch 425 is triggered. For instance, to accommodate the brief upward travel of the shelf required to unload the axle lock (e.g., as described with reference to FIGS. 2 and 3), the actuator (plunger 415) for the limit switch 425 is mounted on a spring 420 stiffer than the one inside the limit switch 425 (e.g., aspects of which are shown in FIG. 4).

Figure 5:
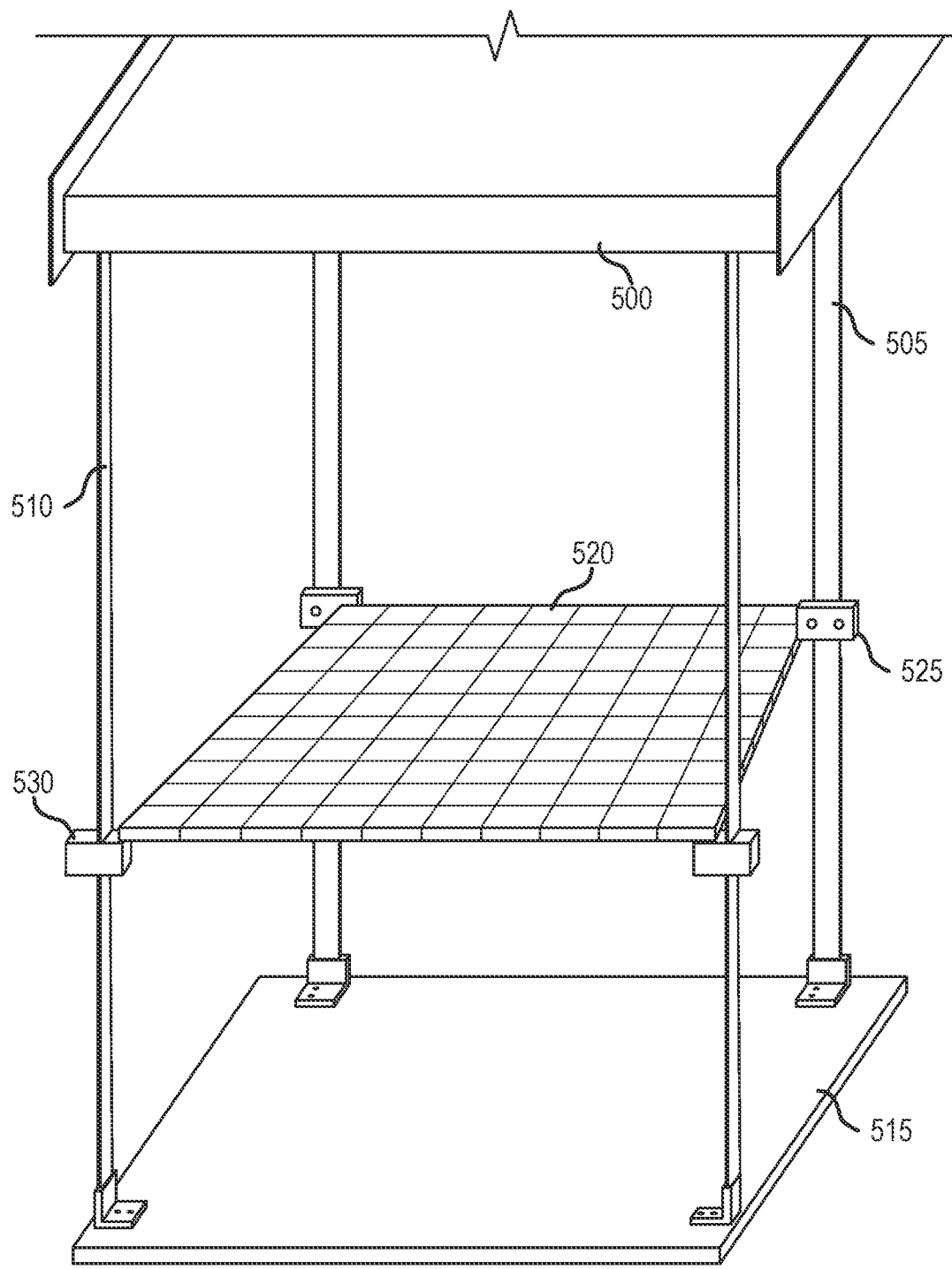
FIG. 5 shows an example of a height checking device according to aspects of the present disclosure.

FIG. 5 shows an example of a shelving system according to aspects of the present disclosure. The example shown includes motor control box 500, rear belts 505, front belts 510, shelf 515, lid 520, hinges 525, and stops 530.

The control box 500 houses the control board and attached components (e.g. those shown in FIG. 2). In some embodiments the control board may also form the bottom of the control box 500.

To prevent the user from stacking too tall a load on the shelf 515, a lightweight, hinged lid 520 may be incorporated in a shelving system. For instance, a lid 520 may be configured to indicate the top clearance for the loaded shelf 515. The hinges 525 for the lid 520 are attached to the two rear belts 505 and the front of the lid 520 rests on stops 530 attached to the front belts 510 (e.g., or side belts). Accordingly, a lid 520 mounted with hinges 525 to rear belts 505 and resting on stops 530 attached to front belts 510 may provide a safety check mechanism (e.g., that may check whether the items loaded on the shelf 515 won't bump into the board supporting the drive mechanisms, that may result in object too large not being able to fit onto the shelf 515, etc.).

Shelf 515 is an example of, or includes aspects of, the corresponding element described with reference to FIGS. 7, 10, 11, 15, 16, and 18-20.

Figure 6:
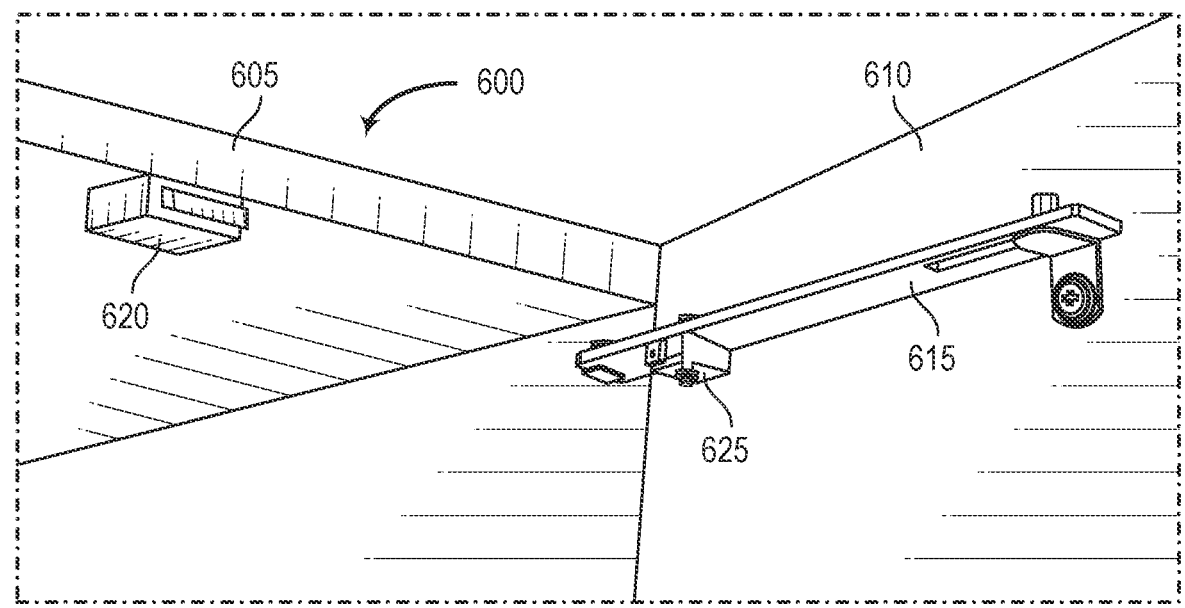
FIG. 6 shows an example of a door limit switch diagram according to aspects of the present disclosure.

FIG. 6 shows an example of a door 610 limit switch diagram according to aspects of the present disclosure. The example shown includes cabinet 600, door 610, lever arm 615, first limit switch 620, and second limit switch 625.

FIG. 6 illustrates one or more aspects of rotation of a lever arm 615 that causes the inside of door 610 (e.g., a cabinet 600 door 610) to depress a limit switch when door 610 is perpendicular to the face of cabinet 600 (e.g., when door 610 is in a 90 degree open position relative to cabinet 600). In some cases, for cabinet 600 doors 610 which are not too high (e.g., as is the case in houses with 8 ft ceilings), a user may open and close the doors 610 manually. In some implementations, a door 610 may be limited in its range of motion by a slotted lever arm 615 which rotates on a pin until it contacts the door 610 at its 90 degree position (e.g., as illustrated in FIG. 6).

Accordingly, detection of the position of door 610 is performed via limit switches. For example, a first limit switch 620 may be attached to the facade 605 for a closed door 610, and a second limit switch 625 may be attached to the lever arm 615 for an opened door 610. For instance, if a user presses a command button when door 610 is closed, the control system inhibits power from flowing to the motor and alerts the user (with a buzzer or speech synthesizer) to first open the door 610 such that the door 610 is perpendicular to the cabinet 600 for proper operation.

In some examples, shelving systems may alert users via a speaker. For instance, speakers may be provided as integrated with other elements of shelving systems described herein, or may be stand-alone units. The audio component generated alerts may be played through speakers. In some embodiments, the audio may be distributed to a receiver (not shown), which processes and outputs the audio via speakers.

Cabinet 600 is an example of, or includes aspects of, the corresponding element described with reference to FIG. 12. In one aspect, cabinet 600 includes facade 605. Door 610 is an example of, or includes aspects of, the corresponding element described with reference to FIGS. 10-12.

Figure 7A:
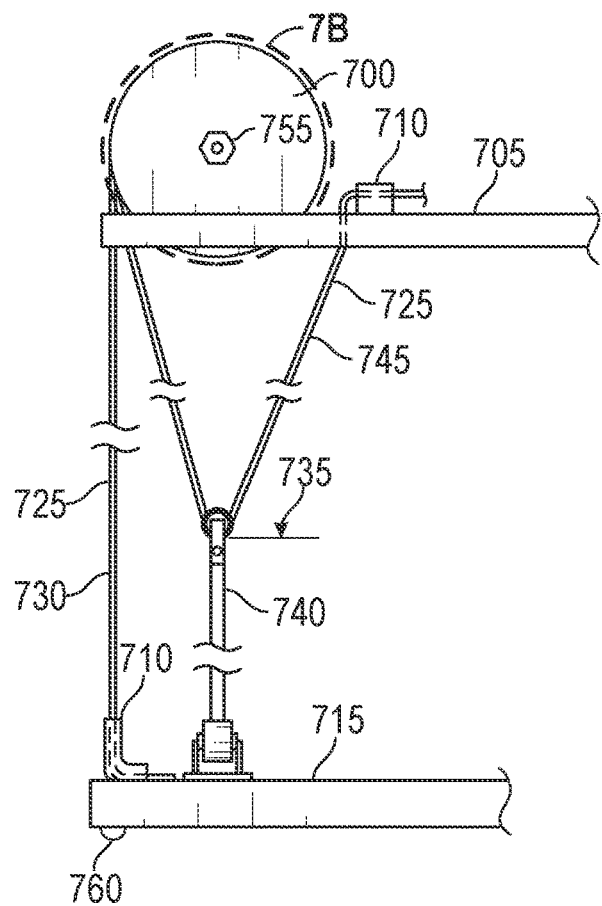
FIGS. 7A, 7B, and 7C show an example of a variable length electrical connection system according to aspects of the present disclosure.
Figure 7B:
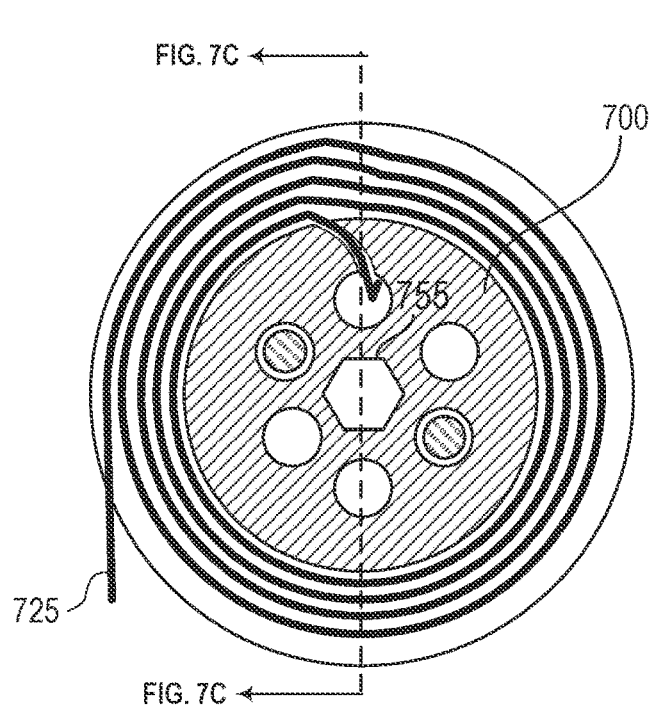
Figure 7C:
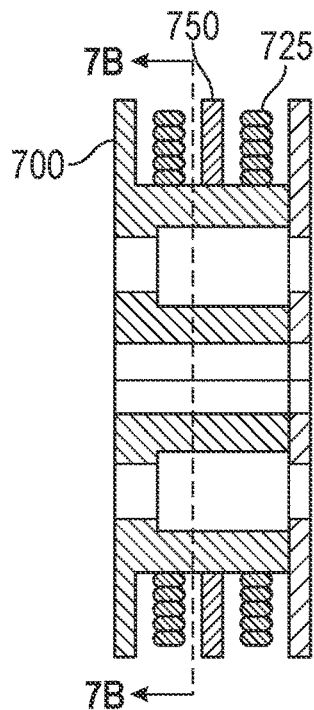

FIGS. 7A-7C show an example of a variable length electrical connection based on wrapping a long flat cable 725 around spool 700 according to aspects of the present disclosure. The example shown includes spool 700 (e.g., a plastic spool on a hex axle), control board 705, flat cable clamps 710, shelf 715, and multi-wire ribbon cable 725.

In some implementations, velocity control during ascent or descent may be controlled by pulse width modulation (PWM) of the power to the motor, using the distance between shelf 715 and countertop measured by an ultrasonic sensor mounted on the bottom side of a shelf 715. The acceleration of the shelf 715 from rest and its deceleration as it approaches the countertop may be constant (e.g., over roughly 10 cm from each end position). In between, the shelf 715 may move at approximately a constant speed. In some examples, DC power and ultrasonic sensor signals may be carried between a microprocessor on the motor board and the ultrasonic sensor underneath the moving shelf 715 by a 6-wire ribbon cable 725 which wraps around a hex bore spool 700 mounted on a hex axle 755 in a ring on each side of a flat plastic washer 750. A V-shaped portion 745 of the ribbon cable 725 hangs from the control board 705. The vertex of the V-shaped portion 745 has a variable height 735. The V-shaped leg 745 of the ribbon cable 725 is held taut by a constant force coil spring 740 pulling on the vertex of the V-shaped leg 745. A straight leg portion 730 of the ribbon cable 725 connects to the moving shelf 715.

For example, FIG. 7A may illustrate an elevational view of an electrical path between a microprocessor (e.g., on a control board 705) and an ultrasonic sensor on a shelf 715. FIG. 7B illustrates in a sectional view detail aspects of spool 700. FIG. 7C illustrates detail aspects of spool 700 from a different sectional view.

When the countertop is reached, the motor for vertical motion is disabled by a limit switch whose actuator protrudes below the bottom of the shelf 715. Since the limit switch is mounted on the moving shelf 715, the electrical connection (e.g., with an Arduino control circuit) also utilizes a variable length electrical connection. This is provided, again, by two wires of the ribbon cable 725 which wraps around a spool 700 on the hex drive shaft 755 of the motor board. At the opposite end of travel, a limit switch mounted to the anti-sway rod is actuated by the sliding can enclosing the spring which permits upward motion beyond the stop set by the limit switch. In the case of the ultrasonic sensor, its signal may be repetitively polled as the shelf 715 moves.

Rubber feet bumpers 760 on the bottom of the shelf 715 may soften the landing of the shelf 715 when it contacts a countertop. Though speed control using the proximity sensor may bring the shelf 715 to a safe stop, given the fact that some counters are made out of hard materials like granite or quartz, rubber feet give an additional level of safety.

Shelf 715 is an example of, or includes aspects of, the corresponding element described with reference to FIGS. 5, 10, 11, and 15-20.

Figure 8:
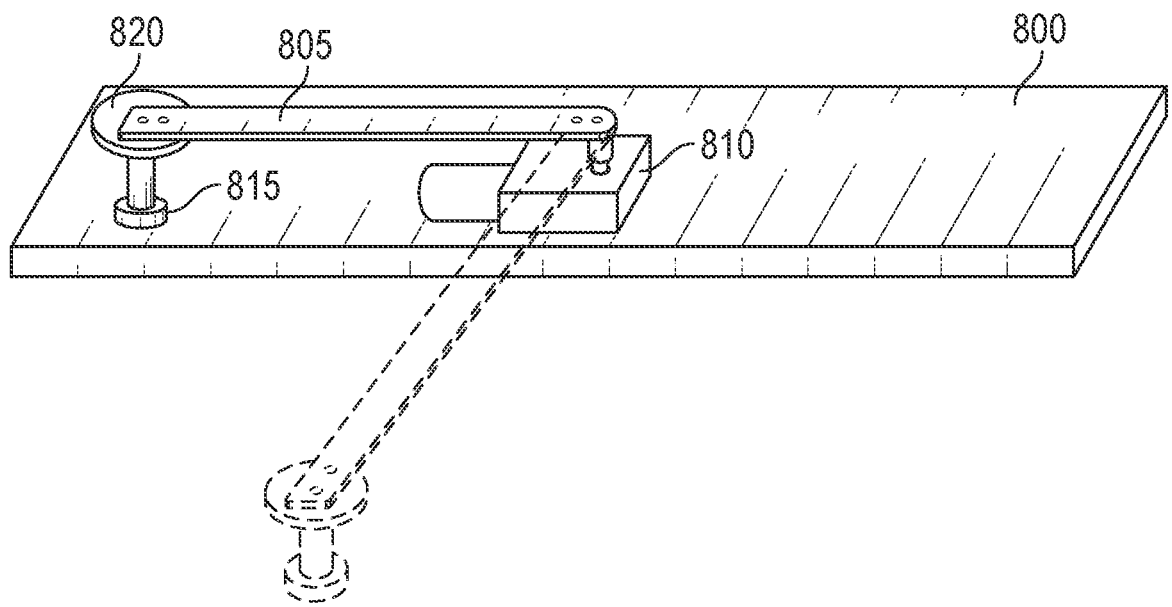
FIG. 8 shows an example of an obstacle detection system according to aspects of the present disclosure.

FIG. 8 shows an example of an obstacle detection system according to aspects of the present disclosure. The example shown includes motor board 800, mounting arm 805, mounting arm motor 810, camera 815, and ring LED light source 820 with separate RGB control.

In some examples, an obstacle detection system may be implemented to inhibit the shelf from descending if an obstacle has been left lying on the countertop in the path of the descending shelf. In the event that an obstacle is detected, the elevator shelf may give an alert (e.g., an audible alert) to the user. A camera 815 or imaging device may acquire and store images in auxiliary memory (using a data-logging auxiliary board and a micro SD memory card).

Examples of memory include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some aspects, software may store images to identify changes in the images of a scene (e.g., captured via the camera 815 or imaging device). As an example, a camera 815 may be mounted on a mounting arm 805 (e.g., a 7" long arm which rotates 90 degrees) to provide the camera 815 with an unobstructed view of a countertop (e.g., a countertop under a cabinet shelving system) while the control board and shelf remain inside the cabinet (e.g., one or more aspects of which are shown in FIG. 8). The resulting image is then compared with a reference image of the empty countertop.

In some implementations, to make the image comparator insensitive to changes in ambient lighting conditions, the countertop may be illuminated with an RGB color distribution different from a solar or an electric light spectrum via ring LED light source 820. In some examples, such light sources 820 (e.g., LEDs) may be mounted on a same mounting arm 805 as the camera 815. An image comparator provides a reliable way to detect an obstacle, for example, because an image comparator may check 3 color signals from light sources 820 (e.g., digitized with 8-bit resolution) of each pixel and the image comparator may declare a mismatch if the signal from a single pixel deviates by one or two bits (e.g., in any of the three colors of light sources 820).

Figure 9:
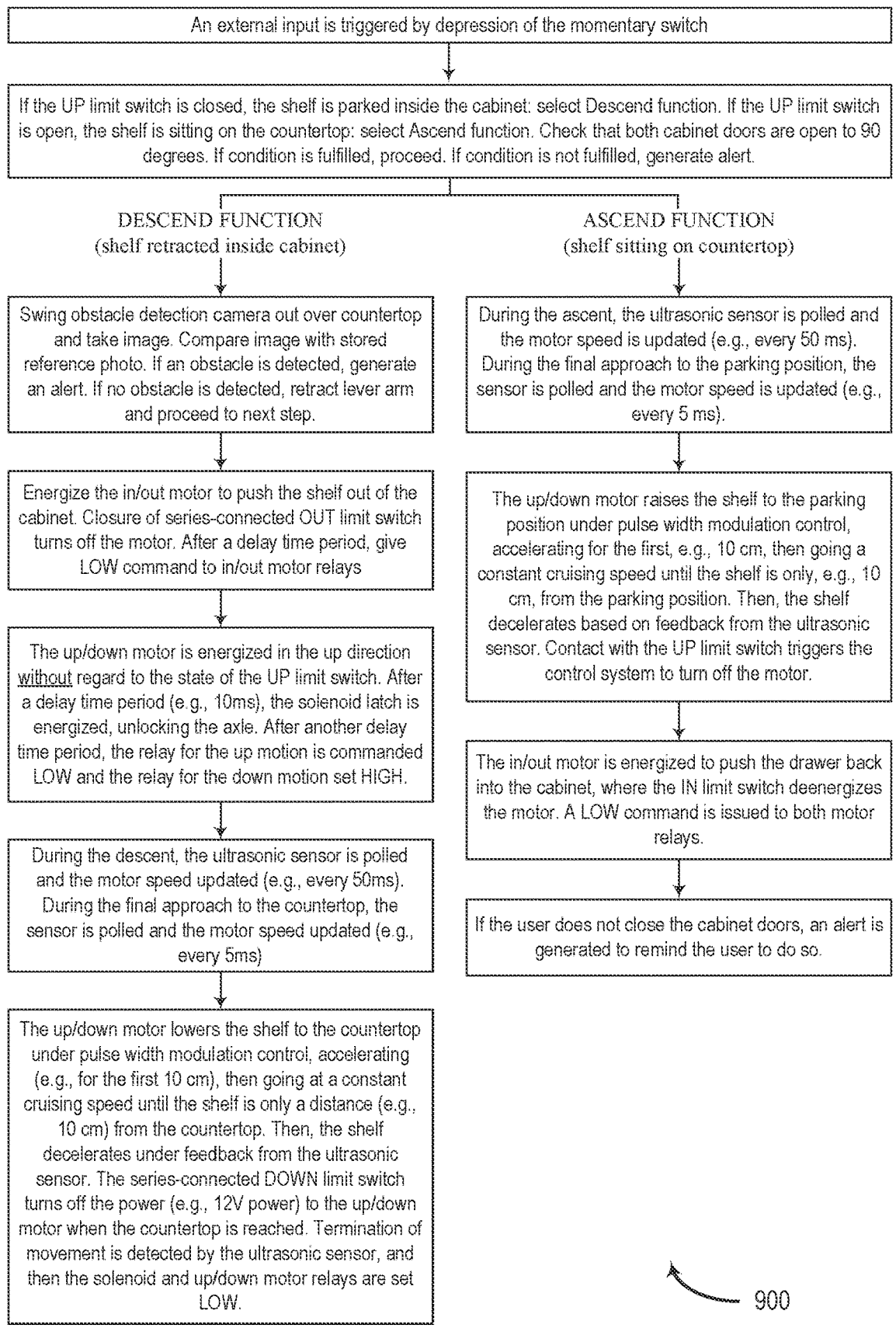
FIG. 9 shows an example of a control program flowchart according to aspects of the present disclosure.

FIG. 9 shows an example of a control program flowchart 900 according to aspects of the present disclosure.

According to some aspects of the present disclosure, a microprocessor may be used to integrate the sensory inputs and motor operation into a single programmed sequence of events actuated by depression of the momentary push-button switch. The microprocessor-based control system powers three motors and one solenoid. The microprocessor may receive signal inputs from limit switches which detect that doors are open, the states of the UP and DOWN limit switches, and the ultrasonic proximity sensor which measures the distance between shelf and countertop. In some examples, the control system may receive signals from a camera in an obstacle detection scheme which checks that the countertop is clear (e.g., as described in more detail herein, for example with reference to FIG. 8).

In some examples, the motors and solenoid may all run at 12V DC. The microprocessor board may also accepts 12V power and may step the power down to 5.0 and 3.3 volts for the relays and sensors connected to the microprocessor.

An electronic flow diagram is shown in FIG. 9. Mounting a power supply (e.g., a 12C DC power supply) to the ceiling of the cabinet, rather than to the surface of the motor board, may reduce the weight of what is moved in and out of the cabinet and may save space on the board for the other electrical components (e.g., such as the blade fuse box, the 5V relays, the PWM speed controller, and the circuit board with the microprocessor).

Operation of the elevator shelf may be initiated by depressing a momentary, push button switch. In one example, the pulse from the push button may initiate the following sequence, which may be controlled by the software-programmed microprocessor:

1. Check that both cabinets doors were manually opened by reading the state of the doors—open limit switches.
2. Swing the 6 in-long arm holding the CMOS camera out to the 90 degree position. Take a camera image of the countertop and compare with the stored reference image. If the difference between the two images is less than 1 or 2 bits/pixel, permission is given to lower the shelf. Return lever arm to position inside the control box.
3. Actuate the in/out motor to push the control board and shelf out of the cabinet on the drawer slides if the countertop is clear. If the countertop is not clear, sound an alarm or buzzer. After clearing the countertop, the user may depress the push button to renew the descent sequence.
4. Actuate the up/down motor to raise the shelf briefly, to enable powering of the solenoid without a load from the teeth of the axle-mounted, hex-bore gear pressing on the finger of the door latch. The shelf is now free to descend.
5. Actuate the up/down motor to lower the shelf with the reel/belt suspension system. The ultrasonic distance sensor slows down the motor as the shelf approaches the countertop and the DOWN limit switch disables the motor as soon as the countertop is reached.
6. Closure of the DOWN limit switch also de-energizes the solenoid. Detection of termination of motion by the ultrasonic sensor can be used redundantly to de-energize the up/down motor and solenoid.

In such an example, a second depression of the push button initiates the ascent of the shelf and its return to its home position inside of the cabinet. For instance, the push button may trigger the following sequence.

1. Actuate the motor to lift the shelf. If the cabinet doors are not in the 90 degree open position, the buzzer will sound. The user may correct the door position and then depress the push button again to re-initiate the ascent. The ultrasonic distance sensor slows down the motor as the shelf approaches its home position. When the limit switch is depressed, the up/down motor is de-energized.
2. Actuate the window motor to withdraw the board into the cabinet. Power to the window motor is turned off when the IN limit switch is depressed.
3. The user may now close the cabinet doors manually.
4. A buzzer or voice synthesizer can be used to alert the user to close the cabinet doors, if the user has not done so.

In addition to kitchen cabinets with countertops below them, the techniques and systems described herein may be implemented for other applications, for example, such as cabinets mounted over refrigerators or 5 ft tall pot closets. In these two cases, the shelf may slide out significantly farther than the depth of the shelf. In the case of a refrigerator, the extra distance may be, for example, approximately 6 inches. For a pot closet, the extra distance may correspond to the thickness of the door and door pull (e.g., ~2 inches). When the depth of a cabinet is much greater than its width, as in the case of a cabinet above a pot closet, the folded arm drive used in a standard 2-door kitchen cabinet may not provide a long enough stroke to push the shelf clear of the pot closet door handle. In this case, the pushing can be done with the curved metal tape of a tape measure modified to serve as a telescoping linear actuator by attachment to a rotating axle, or with a telescoping ball screw actuator.

Generally, the techniques and systems described herein may be implemented in various scenarios and configurations to convert rarely used storage space above objects (e.g., such as refrigerators, pot closets, etc.) into accessible areas for storing items (e.g., such as canned goods, spices, cereal boxes, dry food containers, sugar, flour, grains, coffee cans, paper goods, bags, wine bottles and other items typically found in walk-in pantries).

Figure 10:
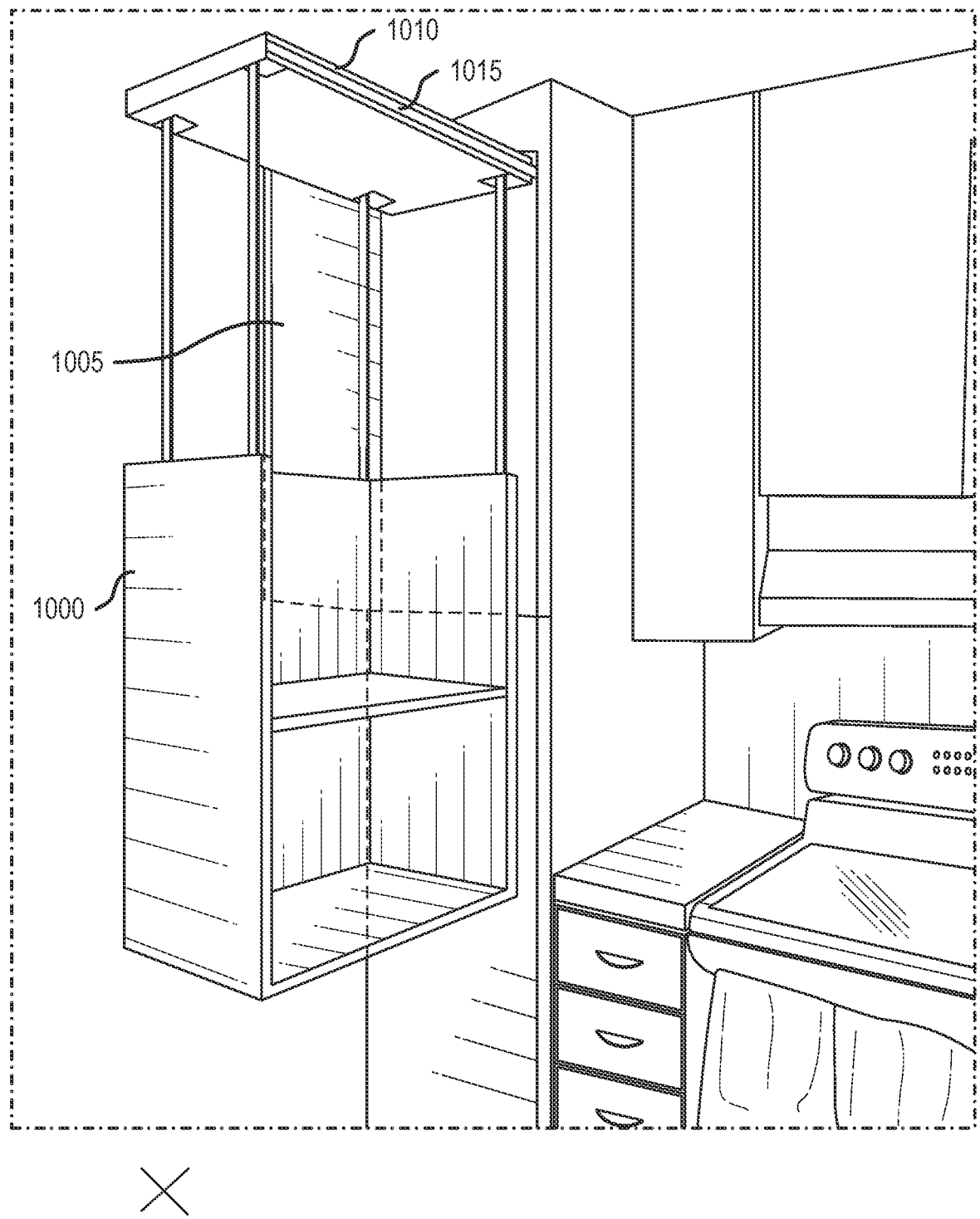
FIG. 10 shows an example of a multi-level "pantry shelf" according to aspects of the present disclosure.

FIG. 10 shows an example of a multi-level "pantry shelf" according to aspects of the present disclosure. The example shown includes shelf 1000, door 1005, control box 1010, and drawer slide 1015.

For instance, FIG. 10 illustrates an example in perspective view showing a shelf 1000 (e.g., a pantry shelf 1000) suspended from a control box 1010 in front of a pot cabinet and accessed from the righthand side of the single-door 1005 cabinet. For instance, in the example of FIG. 10, a cabinet over a pot closet may be approximately 24 inches deep with a usable interior width of approximately 14.5 inches. Such a cabinet may be customized, for example, into a tall (e.g., approximately 24 inches), multi-compartment, multi-level unit with separate holders for the different size items which are stored on it.

Shelf 1000 is an example of, or includes aspects of, the corresponding element described with reference to FIGS. 5, 7, 11, and 15-20. Door 1005 is an example of, or includes aspects of, the corresponding element described with reference to FIGS. 6, 11, and 12. Control box 1010 is an example of, or includes aspects of, the corresponding element described with reference to FIGS. 2, 3, 5, 7, 11, and 16-20.

Figure 11:
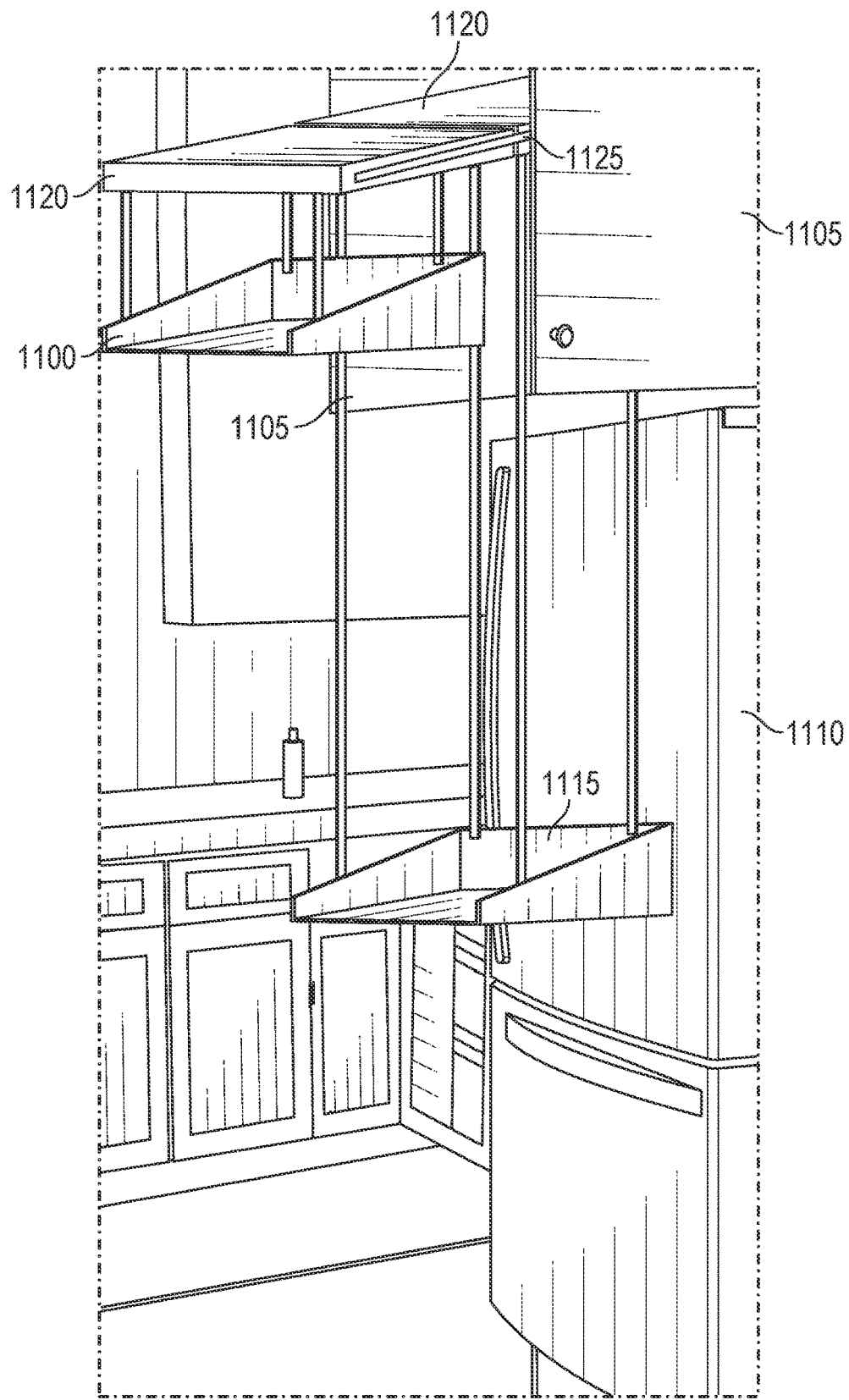
FIG. 11 shows an elevator shelf system comprised of two shelves parked one behind the other in a deep cabinet according to aspects of the present disclosure.

FIG. 11 shows an example of a shelving system according to aspects of the present disclosure. The example shown includes front shelf 1100, doors 1105, refrigerator 1110, rear shelf 1115, control boxes 1120, and drawer slide 1125.

For instance, FIG. 11 illustrates an example installation drawing of two pantry shelves in front of the refrigerator 1110, the front shelf 1100 positioned at its parked height when inside the cabinet and the rear shelf 1115 descended to countertop height.

For example, the shelf space over a refrigerator is typically deep (e.g., about 29 inches) with a height (e.g., of about 2 feet), and is located unusually high above the floor (e.g., about 71 inches). To best take advantage of its 29 inch depth, one could install two elevator shelves using a single pair of long drawer slides 1125, the rear shelf 1115 behind the front shelf 1100, enabling the separate lowering of either 14½ inch deep shelf 1100 or 1115. If the front shelf 1100 were parked 6 inches above the floor of the cabinet, a person 6½ feet tall could safely walk under it while the rear shelf 1115 is lowered in front of the refrigerator 1110. With a parking position 6 inches above the floor of the cabinet, the front elevator shelf 1100 would still have a useful height for storage about 11 inches. It would be advantageous to give the user separate push buttons for each of the shelves 1100 1115, enabling him to lower the front shelf 1100 or back shelf 1115, as desired, immediately in front of the refrigerator 1110 door. Such an arrangement (e.g., of two shelves with the front shelf 1100 in front of the rear shelf 1115, where each of the front shelf 1100 and the rear shelf 1115 descends immediately in front of a refrigerator 1110) leaves the maximum aisle space in front of the lowered rear shelf 1115.

In some examples, it may be desirable to make the front shelf 1100 and the rear shelf 1115 rigid against lateral pressure. In the case of the pantry shelf over the 5-foot-tall pot closet (such as previously described with respect to FIG. 10), pins (e.g., a couple of pins) mounted off the back of the shelf 1000 which engage holes in a horizontal bar mounted near the bottom of the cabinet doors 1005 may lock the shelf 1000 against motion left to right and against motion front to back. In some instances, a method for stabilizing the shelves 1100 1115 which reside in the cabinet space over a refrigerator 1110 may not utilize the cabinet doors 1105, because there may be a gap of several feet between the bottom of the cabinet doors 1105 and the top of the shelf structure in its lowered position. In this case, two orthogonal sets of custom scissor jack braces (like the parallelogram sides of a scissors jack lab stand) may provide the desired rigidity. With a slotted horizontal side slat to constrain the inward motion of the arms at the top and bottom of each X, the hanging weight of the shelf forces the scissors jack into a rigid structure of stacked triangles.

For example, to obtain 39 inch separation between the bottom of the motor box and the top of the shelf's back wall in its lowered position, the rear scissors brace may include two stacked Xs (e.g., with each of its crossed arms 27½ inches long). Further, the side scissors brace may include five stacked Xs (e.g., with each of its crossed arms 13 inches long).

In another example, collapsible, telescoping trekking poles, may be used (e.g., particularly for the side braces which include a scissors brace with five stacked Xs). With the addition to the standard 3-piece, aluminum telescoping pole of a fourth tube still smaller in diameter, the collapsed pole would fit inside the cabinet and the extended pole would be long enough to reach countertop level.

Though elevator shelves suspended in front of a pot closet or a refrigerator may not land on a countertop, a DOWN limit switch can still be incorporated. In the case of the pantry shelf 1000 above the pot closet, the limit switch can be built into the mating pins and holes that locks the pantry shelf 1000 to its cabinet door 1005. In the case of the pantry shelves 1100 1115 descending in front of a refrigerator 1110, the limit switch can be incorporated into the scissors jack brace which stabilizes it laterally. It can be actuated by one of the guide pins in the slotted side slats that provide a stop to the downward motion.

The present design does not limit the user to installing only a single elevator shelf in a cabinet. Two, placed one above another, could be installed in a single cabinet. For example, in homes with ceilings greater than 8 feet in height, multiple elevator shelves would be attractive.

Shelf 1100 is an example of, or includes aspects of, the corresponding element described with reference to FIGS. 5, 7, 10, 15-20. Door 1105 is an example of, or includes aspects of, the corresponding element described with reference to FIGS. 6, 10, and 12. Control Box 1120 is an example of, or includes aspects of, the corresponding element described with reference to FIGS. 2, 5, 7, 10, 18, and 19. Drawer slides are an example of, or includes aspects of, the corresponding element described with reference to FIG. 10.

Figure 12:
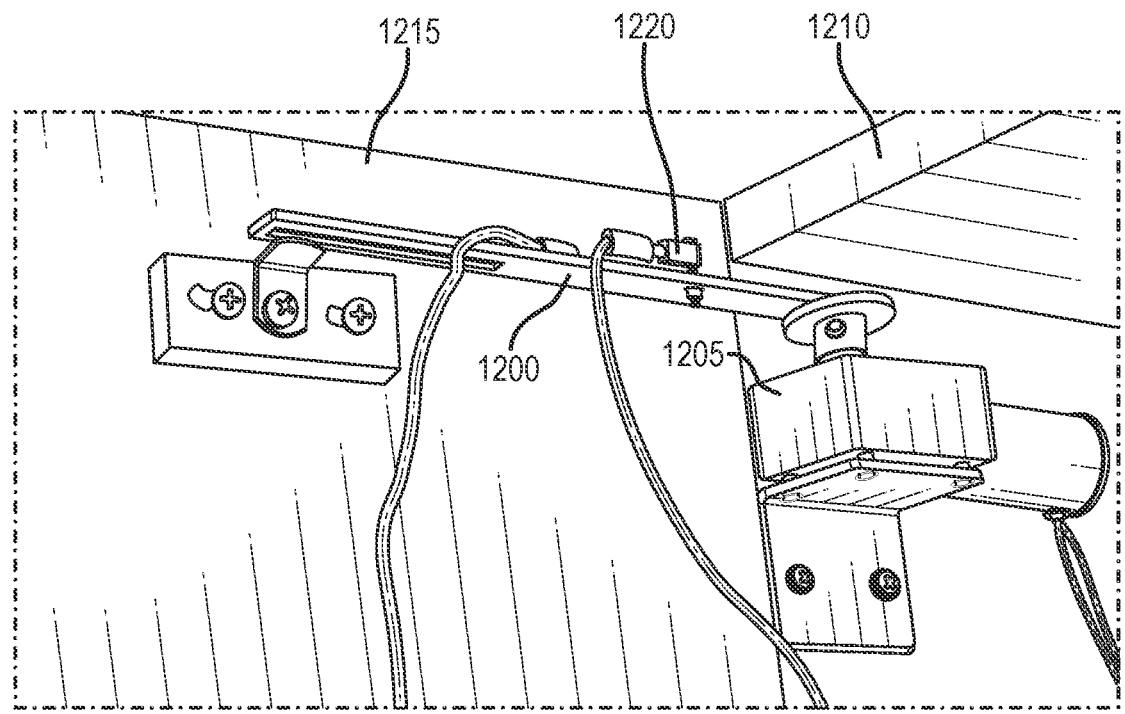
FIGS. 12 through 14 show examples of a mechanism for opening and closing a door or a pair of doors according to aspects of the present disclosure.

FIG. 12 shows an example of a powered mechanism for opening and closing a door 1215 according to aspects of the present disclosure. The example shown includes slotted lever arm 1200, motor 1205, cabinet 1210, and door 1215.

For instance, FIG. 12 illustrates an example installation drawing of a motor-driven (e.g., via motor 1205), slotted lever arm 1200 to open and close cabinet doors 1215. For instance, in some examples, kitchens in some houses (e.g., in upscale houses with 9+ foot ceilings) have cabinets 1210 extending from 8 feet to the ceiling with their own separate cabinet doors 1215. If elevator shelves were installed in these cabinets 1210, it may be desirable to make depression of the push button automatically drive the cabinet doors 1215 open by means of a motor-driven, slotted lever arm 1200 mounted to the inside wall of the cabinet 1210 which slides over a pin fixed to the inside surface of the door 1215. Limit switches on the lever arm 1220 and attached to the ceiling are connected to the microprocessor and give indication of an open state or closed state, respectively, of the cabinet door.

Motor 1205 is an example of, or includes aspects of, the corresponding element described with reference to FIG. 1. Cabinet 1210 is an example of, or includes aspects of, the corresponding element described with reference to FIG. 6. Door 1215 is an example of, or includes aspects of, the corresponding element described with reference to FIGS. 6, 10, and 11.

Figure 13:
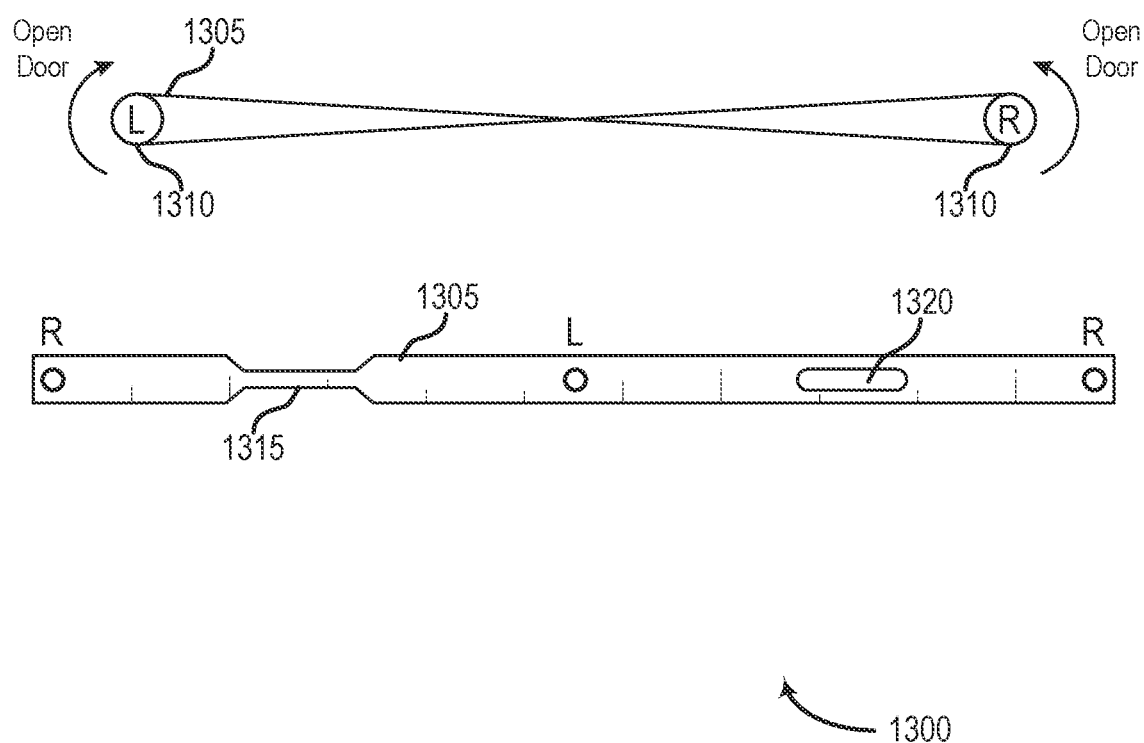

FIG. 13 shows an example of a mechanism 1300 for opening and closing two doors simultaneously according to aspects of the present disclosure.

For instance, FIG. 13 illustrates aspects of a belt (e.g., "FIG. 8" belt 1305) coupling motor drive to a lever arm for a second door. For instance, simultaneous opening of two doors may be achieved with a single motor by coupling rotation of each actuator arm with a "FIG. 8" belt 1305 linking the flanged coupling connectors over the two lever arm pivot points 1310. After assembly into a closed loop belt portion 1315 may pass through a slot 1320.

Figure 14:
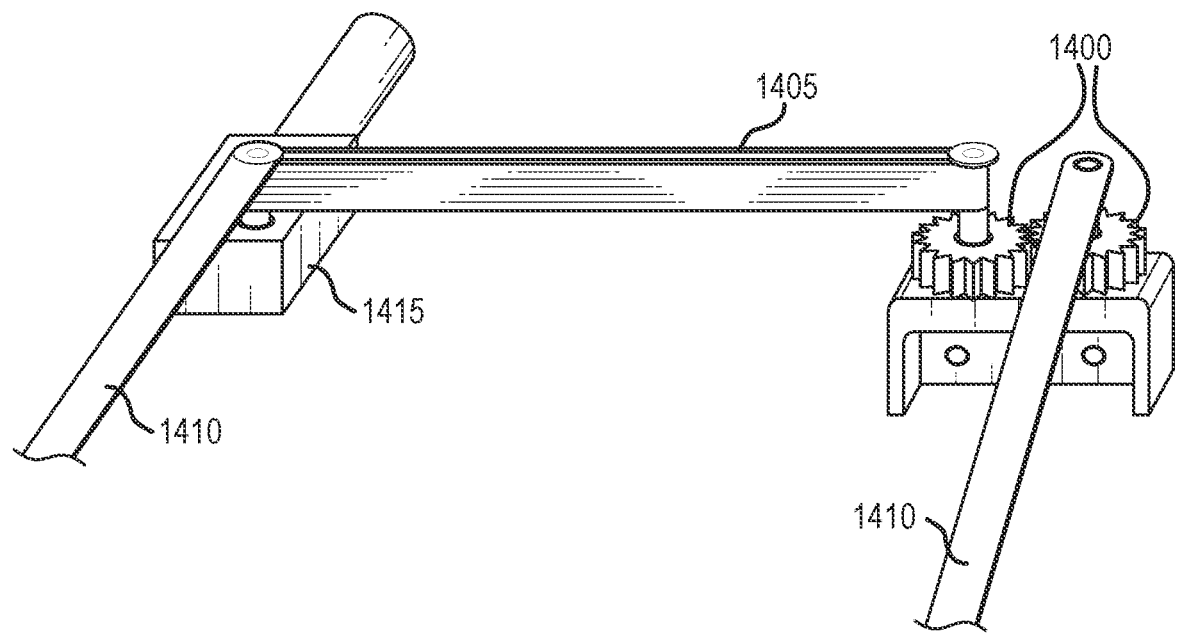

FIG. 14 shows an example of a mechanism for opening and closing two doors simultaneously according to aspects of the present disclosure.

For instance, FIG. 14 illustrates the use of gears 1400 and a simple belt loop 1405 to drive a lever arm 1410 for a second door (e.g., via motor 1415). That is, as an example of an alternative to the techniques described with reference to FIG. 13, two gears 1405 can be used to reverse the direction of rotation of the belt-driven coupling, so that the belt 1405 does not need to be fashioned with a slot in it. Limit switches detect the full open and full closed positions of the door. The limit switch for full OPEN is attached to the lever arm 1410 and contacts the inside surface of the cabinet door when a 90 degree rotation of the door is achieved. The limit switch for full CLOSED is attached to the facade or ceiling of the cabinet and contacts the inner surface of the door in its closed position.

Figure 15:
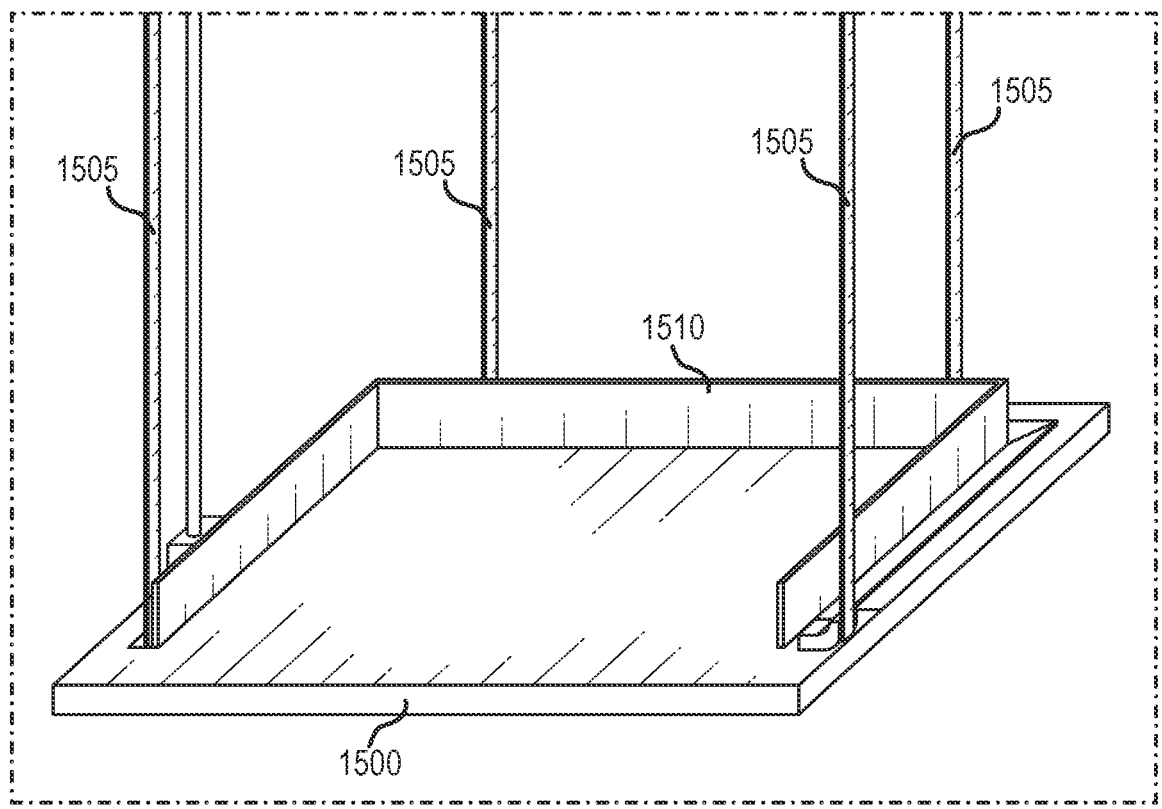
FIG. 15 shows an example of a 3-sided fence to prevent stored items from slipping off the shelf, according to aspects of the present disclosure.

FIG. 15 shows an example of a shelving safety mechanism according to aspects of the present disclosure. The example shown includes shelf 1500, belt 1505, and fence 1510.

For instance, FIG. 15 illustrates a perspective view of a shelving safety mechanism, such as fences 1510 mounted near side edges and the back of a shelf 1500 (e.g., of a moving shelf 1500). For example, it may be desirable to have fences 1510 on the sides and back of moving shelves to ensure that items such as dishes are not placed too close to their edges, where they might inadvertently slide off the shelf 1500. For this purpose, in some examples, angle plastic or plywood, cut to avoid the axle-mounted spools may be implemented.

Shelf 1500 is an example of, or includes aspects of, the corresponding element described with reference to FIGS. 5, 7, 16, 18, and 20. Belt 1505 is an example of, or includes aspects of, the corresponding element described with reference to FIGS. 2, 5, 10, 11, and 16-20.

Figure 16:
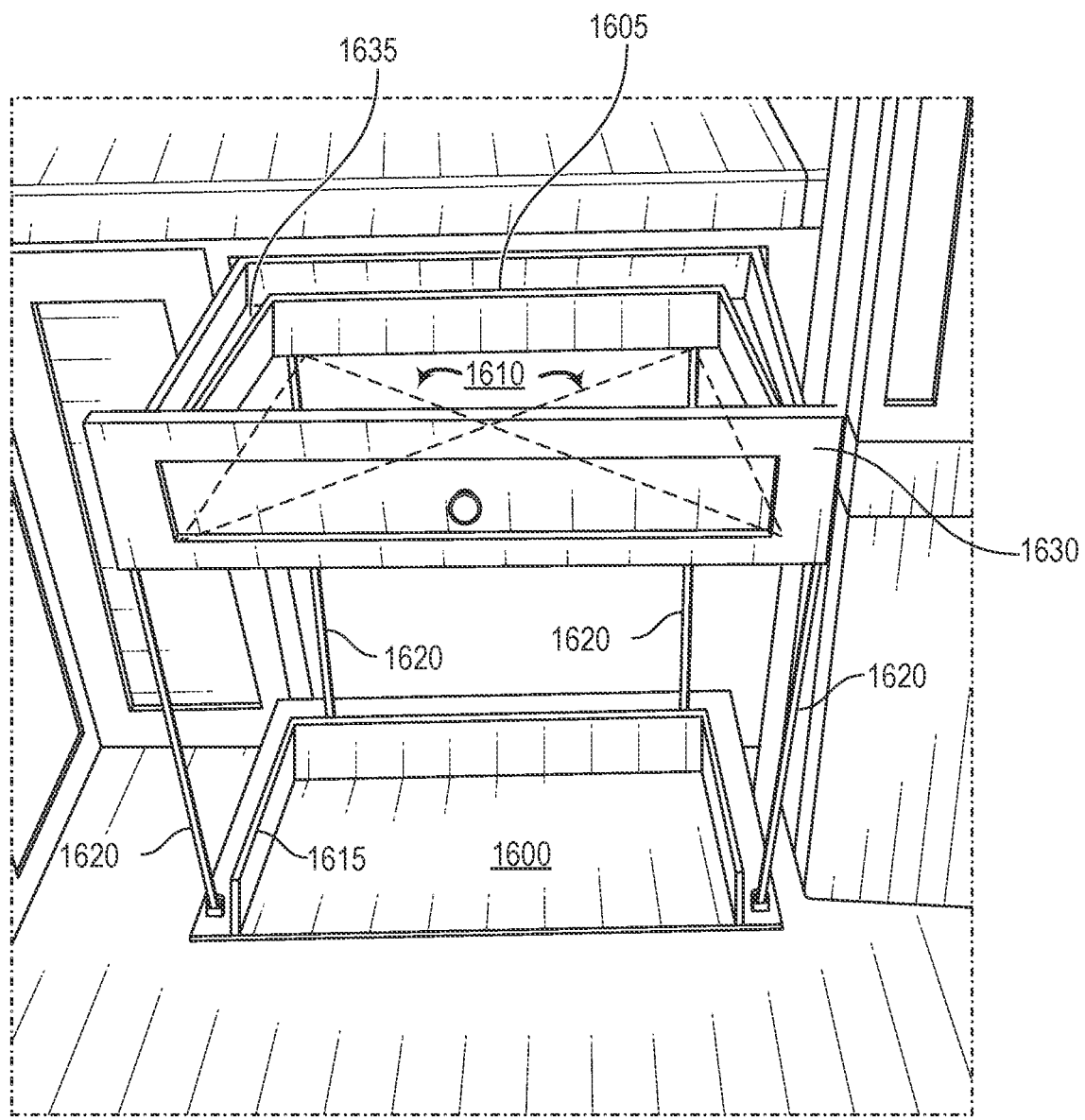
FIG. 16 shows an example of an under-the-counter shelving system according to aspects of the present disclosure.

FIG. 16 shows an example of a shelving system according to aspects of the present disclosure. Shown are shelf 1600, drawer 1630, drawer interior walls 1605, drawer floor opening 1610, shelf interior walls 1615, four belts 1620, and control board 1635. Moveable shelf components (e.g. motors, electronics, axles, cables, switches, etc.) are not shown for clarity.

For instance, FIG. 16 illustrates the use of techniques described herein (e.g., elevator shelf mechanisms) to lift an under-the-counter shelf 1600 or drawer to near-counter height for user access without bending. Further, (e.g., for elderly people who suffer severe pain while bending), the techniques and systems described herein (e.g., elevator shelf techniques and systems) may be used to lift up shelves under the countertop (e.g., making it unnecessary for a user to bend.

The floor of the drawer forms the control board 1635. The shelf interior walls 1615 are slightly narrower than the drawer interior walls 1605. The drawer floor opening 1610 is sized to allow the shelf interior walls 1615 to be raised and lowered through the drawer floor opening 1610. which are slightly narrower that the drawer. Thereby, shelf 1600 may be raised nearly to the height of control board 1635 and the stored items may therefore be accessible from above when the shelf 1600 is in the upper position.

Due to the floor opening 1610, the control board 1635 is located only at the outer perimeter of the drawer, forming a U-shape. The U-shaped axle configuration shown previously may be installed on the U-shaped control board 1635. Due to the limited control board space, in some examples, the motors and electronics may be mounted above the U-shaped axle configuration.

Shelf 1600 is an example of, or includes aspects of, the corresponding element described with reference to FIGS. 5, 7, 10, 11, 15, and 17-20.

Figure 17:
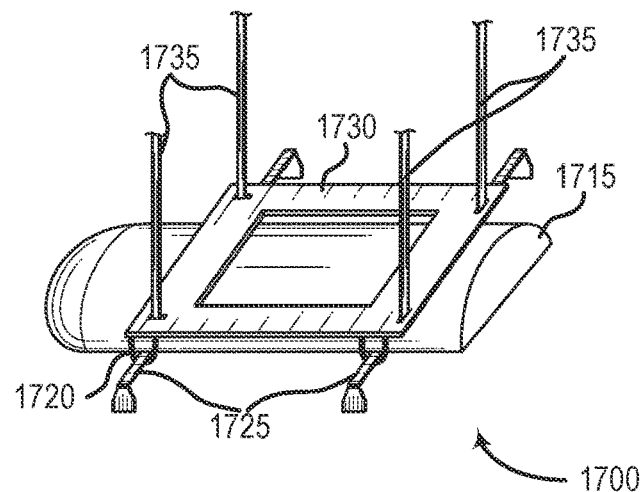
FIG. 17 shows an example of an elevator shelf mounted to joists in a garage holding a plastic clamshell roof storage rack in elevated position according to aspects of the present disclosure.
Figure 17:
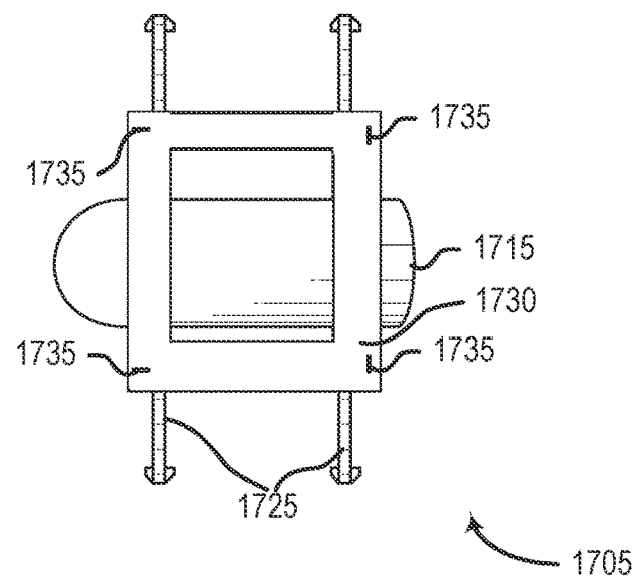
Figure 17:
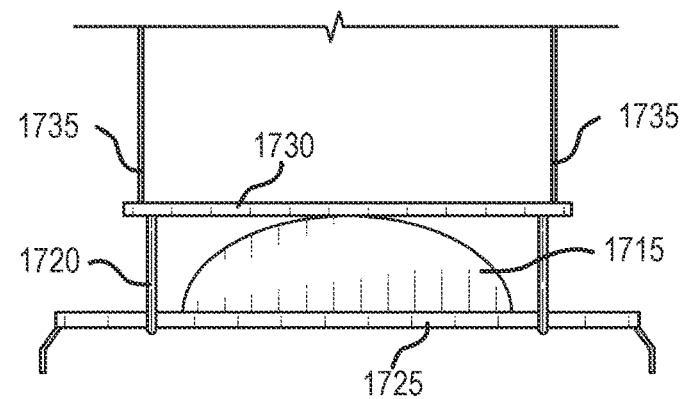

FIG. 17 shows an example of a shelving system according to aspects of the present disclosure, modified for use in storing large objects in a garage. The example shown includes perspective view 1700, top view 1705, and side view 1710. An exemplary plastic clamshell rooftop carrier 1715 (which includes crossbars 1725) supported by an elevator shelf 1730 is shown.

For instance, FIG. 17 illustrates an installation drawing of elevator shelf 1730 mounted to joists in garage (not shown) holding a plastic clamshell rooftop carrier 1715 in elevated position. FIG. 17 illustrates a perspective view 1700 of the shelving system, a top view 1705 of the shelving system, and a side view 1710 of the shelving system. The joist mounted elevator shelf system may, for example, lift a plastic clamshell rooftop carrier 1715 directly off the roof of a car.

In the example shown, the plastic clamshell rooftop carrier 1715 is attached to the elevator shelf 1730 via a plurality of bungee cords 1720, each of which is coupled to a crossbar 1725 of the plastic clamshell roof storage rack 1715.

Garage storage between the horizontal joists that tie the bottom ends of the rafters together is another example application of one or more aspects of the techniques and systems described herein. Though motorized storage systems are commercially available for lifting very heavy items (like snowmobiles or motorcycles) up to the level of the joists, the techniques and systems described herein may provide cheaper and simpler methods for loads under 30 kg (e.g., such as kayaks, canoes, surfboards, boogie boards, rooftop bicycle racks, rooftop plastic clamshell carriers, and other items often stored in garages). For this application, in some examples, no in/out motion is required.

The reel/belt lift system with belt-coupled motor drive can be mounted to a rectangular frame that lays over the joists with a single motor driving four reels 1735 using the gear box arrangement of the kitchen elevator shelf. A motorized elevator shelf system may lift the roof rack or a plastic clamshell rooftop carrier 1715 directly off the roof of a car. Items often stored in garages (e.g., such as folding tables and folding chairs, A-frame ladders, and sports equipment like skis, poles, rackets, other bulky items, etc.) may be readily accessible if stored on a motorized elevator shelf mounted on two adjacent joists.

Figure 18:
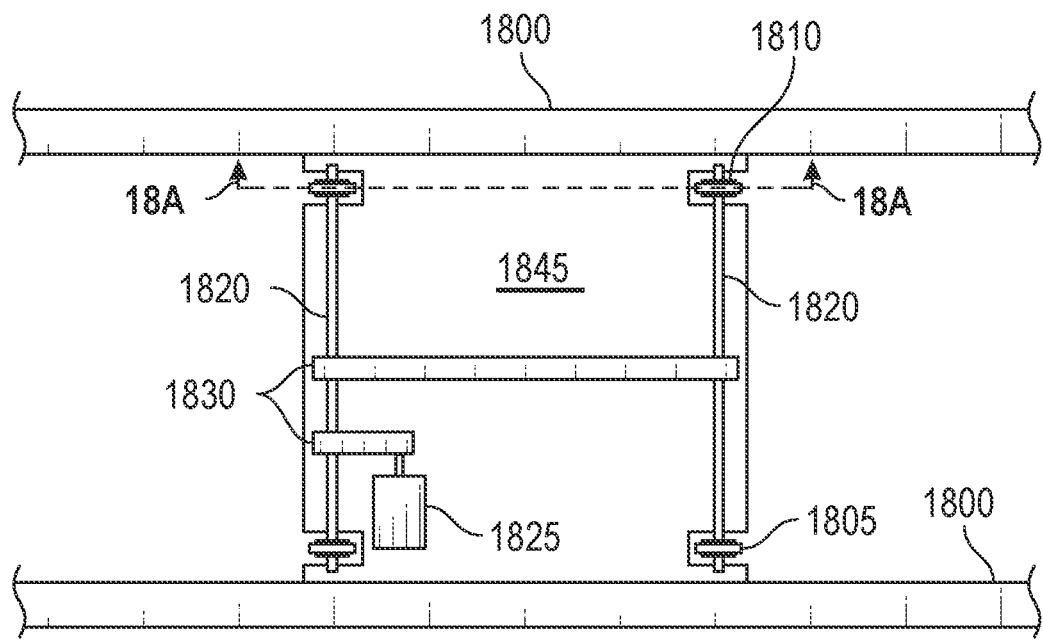
FIGS. 18 and 18A show an example of an elevator shelf mounted to angled rafters supporting a garage roof according to aspects of the present disclosure.
Figure 18A:
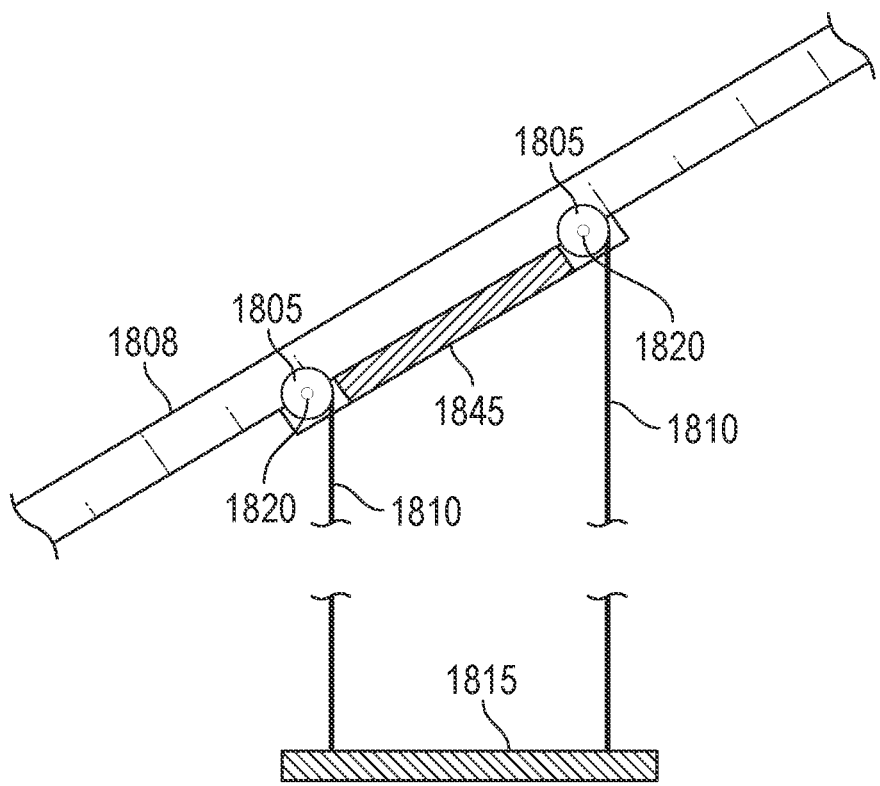

FIG. 18 shows an example of a shelving system according to aspects of the present disclosure which mounts to the angled rafters which support the roof of the garage. The example shown includes rafters 1800, control board 1845, reels 1805, suspension belt 1810, shelf 1815, parallel axles 1820, axle-driving belts 1830 and motor 1825.

The example shown includes top view 1835 and sectional side view 1840

FIG. 18 illustrates an installation drawing of an elevator shelf 1815 mounted to rafters 1800 in garage. For instance, in the example of FIG. 18, the U-shaped axle configuration with two right angle gear boxes may be replaced with a configuration of two parallel axles 1820 belt-coupled to one another via one axle-driving belt 1830.

To gain increased benefit of the vertical space between the horizontal joists and the angled rafters 1800 supporting the garage roof, the control board 1845 can be attached to the rafters 1800, instead of joists. This is possible because the reel/belt systems described herein permit adjusting the belt lengths unequally to maintain a shelf 1815 in a horizontal orientation. However, all reels 1805 must be parallel, on axles that are horizontal. This can be accomplished by having two parallel axles 1820, with one axle 1820 belt-coupled to the motor 1825, e.g. via one axle-driving belt 1830 (as in the elevator for kitchen cabinets), and the second axle belt-coupled to the first, e.g. via the other axle-driving belt 1830. Since all the suspension belts 1810 are parallel, nothing inhibits the shelf 1815 from swaying in the direction perpendicular to the axles. Therefore, it may be desirable to incorporate scissors jack bases on opposite ends of the parallel axles 1820, or telescoping trekking poles. A triangular bracket may be used to hold the top member of each scissors jack brace in a horizontal orientation, or each telescoping trekking pole in a vertical orientation.

Reel 1805 is an example of, or includes aspects of, the corresponding element described with reference to FIG. 2. Suspension belt 1830 is an example of, or includes aspects of, the corresponding element described with reference to FIGS. 2,5, 10, 11, 15-17, 19, and 20. Shelf 1815 is an example of, or includes aspects of, the corresponding element described with reference to FIGS. 5, 7, 10, 11, 15-17, 19, and 20. Drive motor 1825 is an example of, or includes aspects of, the corresponding element described with reference to FIGS. 1 and 12.

Figure 19:
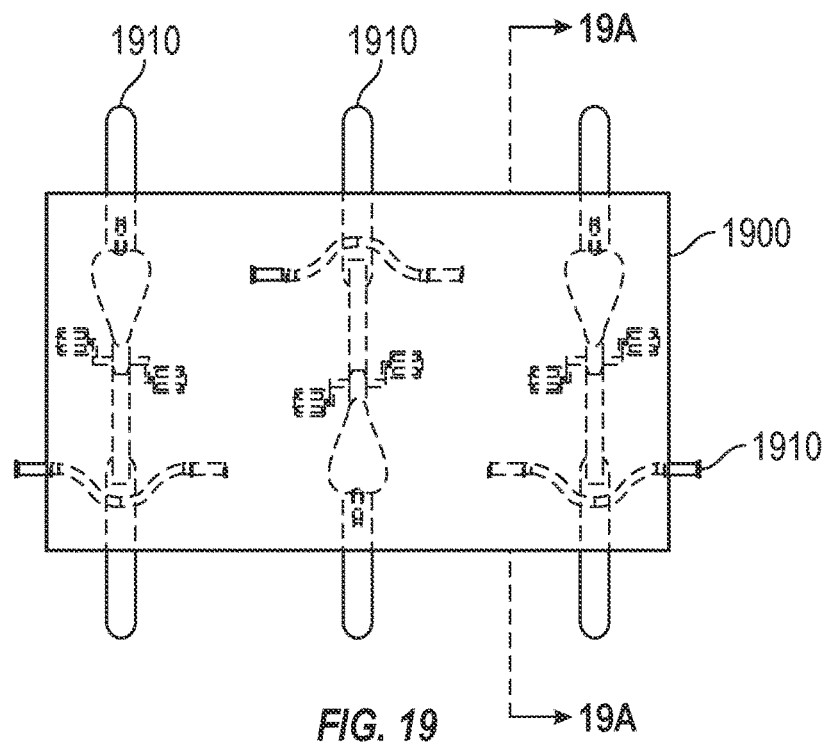
FIGS. 19 and 19A show an elevator shelf mounted to joists in a garage holding three bicycles in an upright position with the center bike pointing in the opposite direction to the outer two according to aspects of the present disclosure.
Figure 19A:
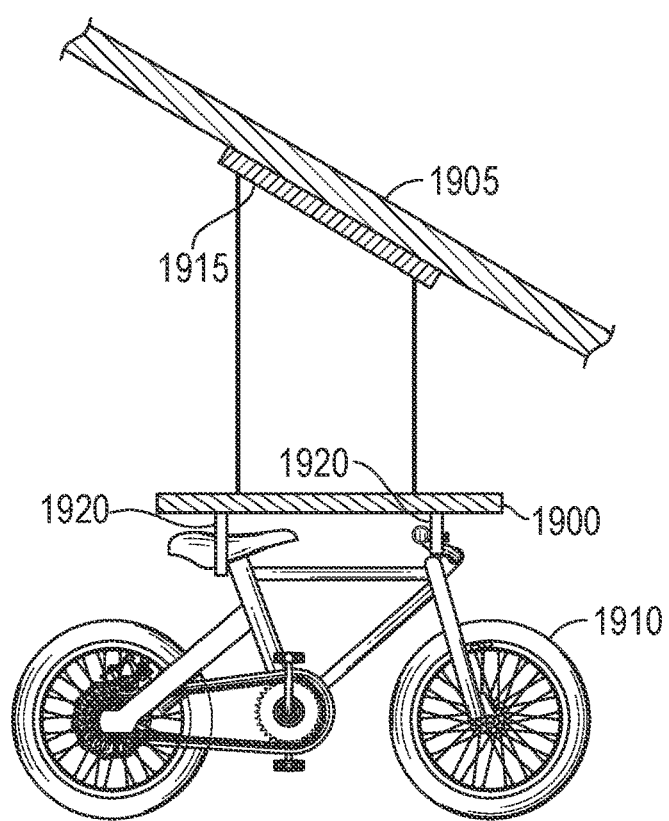

FIG. 19 shows an application of a rafter-mounted shelving system according to aspects of the present disclosure. For instance, FIG. 19 shows an installation drawing of a frame-like shelf 1900, hanging between rafters 1905 of a garage.

Mounting the control board 1915 off the rafters enables one to lift a shelf 1900 above the top of the joists 1905, in a similar manner to manual pulley systems for suspending single bicycles and bicycle roof racks from the rafters of a garage. For lifting items like kayaks and canoes, capturing the boat between a rigid frame above and bungee cords below may eliminate the step of lifting the boat onto a shelf 1900. Hanging multiple bicycles 1910 in the often unused space between joists 1905 and rafters could alternatively be achieved by hanging bicycles 1910 right side up below an elevator shelf with two flexible loops 1920 per bicycle to encircle the handle bar support and seat post. If a middle bicycle 1910 is turned around relative to the outer two bicycles 1910 as shown, interference between the handlebars of adjacent bicycle can be prevented and the space between bicycles minimized. Lifting three bicycles 1910 side-by-side could constitute a load of, for example, 30-40 kg. In one example, polypropylene plastic strapping may be used and plastic spools may also be used (e.g., which together may be strong enough to handle heavy loads, for example, well above 30 kg).

Another possible use of the shelving system of FIG. 19 includes lifting something with a high point (e.g., such as a lawnmower, electric scooter, chairs with high backs, tool boxes or part boxes with shallow drawers set atop a set with deep drawers, or an object with high handlebars, etc.) into the apex of the roof, after rolling it onto the shelf 1900 when the shelf 1900 is sitting on the floor.

Walk-in pantries with shelves from floor to ceiling are another possible application. However, the shelves in such pantries are not usually separated into horizontal segments by vertical walls. The top shelves of a pantry may be replaced with horizontal support arms for drawer slides extending between the back wall and the vertical supports in front of the shelf.

In some cases, techniques and systems described herein may incorporate moveable hanger rods or moveable shelves in closet spaces which enlarge the vertical space in which things can be stored. Out of the way closet storage would be especially handy for out-of-season clothing.

Shelf 1900 is an example of, or includes aspects of, the corresponding element described with reference to FIGS. 5, 7, 10, 11, 15-18, and 20.

Figure 20:
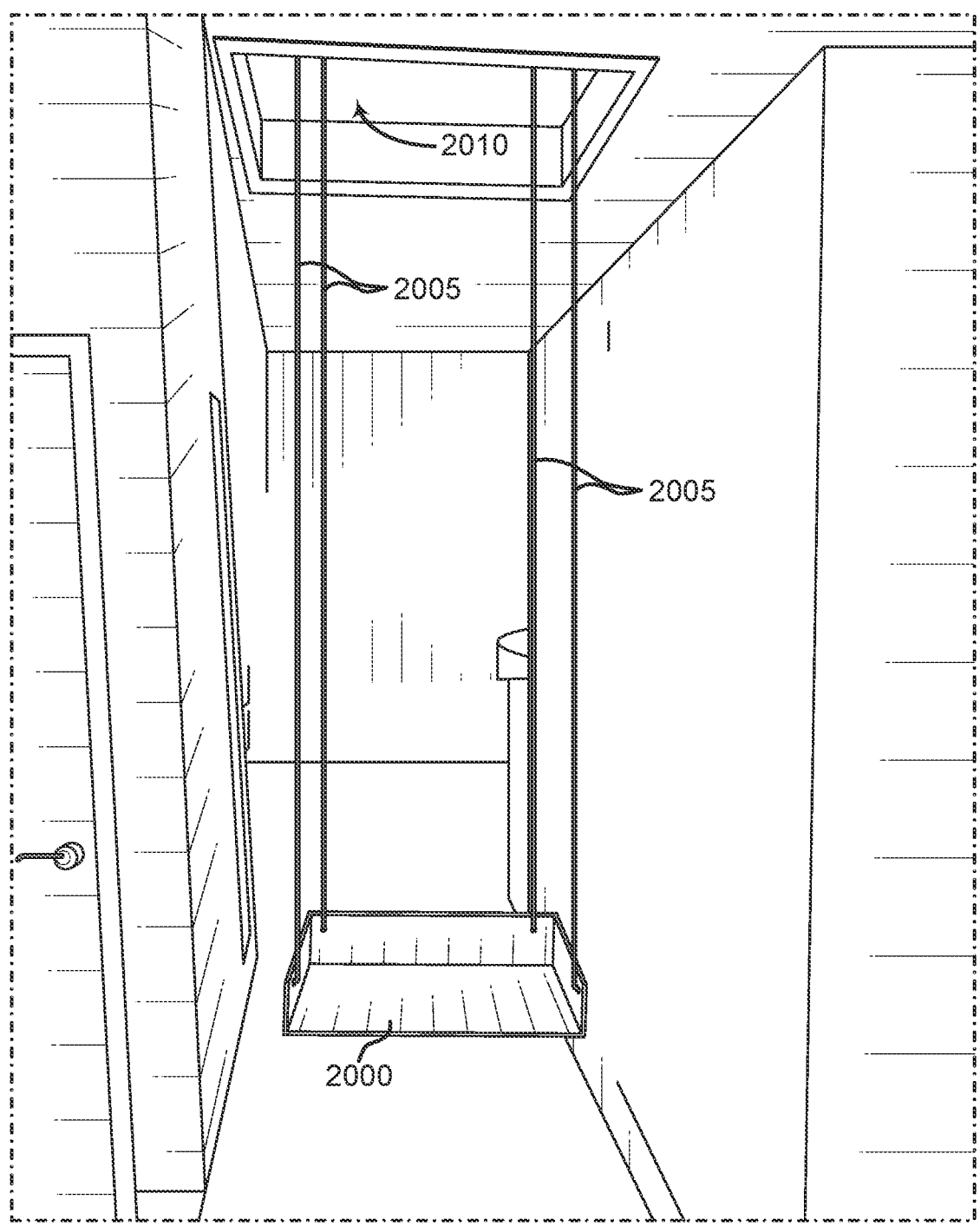
FIG. 20 shows an elevator shelf for lifting boxes into house crawl space, above the ceiling.

FIG. 20 shows an example of a shelving system which is mounted to the rafters of the house roof and used for lifting objects into the crawl space over the ceiling, according to aspects of the present disclosure. The example shown includes shelf 2000, belts 2005, and crawl space 2010.

For instance, FIG. 20 illustrates an example of an installation drawing of a shelving system (e.g., an elevator shelf 2000) for lifting items (e.g., boxes) into areas such as a crawl space 2010 (e.g., above a living area). For instance, some houses may include crawl spaces 2010 (e.g., rather than walk-in attics), for example, above living areas. Storing items in the crawl space 2010 usually involves carrying items up a ladder, lifting the item through crawl space 2010 access hole, and then moving them onto boards placed over the joists. The techniques and systems described herein may be used as a lift to move items from the floor to crawl space 2010, after which the items may be moved laterally onto boards placed over the joists. If a shelf 2000 (e.g., an elevator shelf) were suspended from the rafters, the shelf 2000 could be lifted well above the access hole, permitting one to enter the attic after the items to be stored have been lifted into the crawl space 2010. Also, the elevator shelf 2000 may be stored in the crawl space 2010 above the level of its floor if the elevator shelf 2000 is mounted to the rafters near the ridge line of the roof.

Shelf 2000 is an example of, or includes aspects of, the corresponding element described with reference to FIGS. 5, 7, 10, 11, and 15-19. Belt 2005 is an example of, or includes aspects of, the corresponding element described with reference to FIGS. 2, 4, 10, 11, and 15-19.

Figure 21:
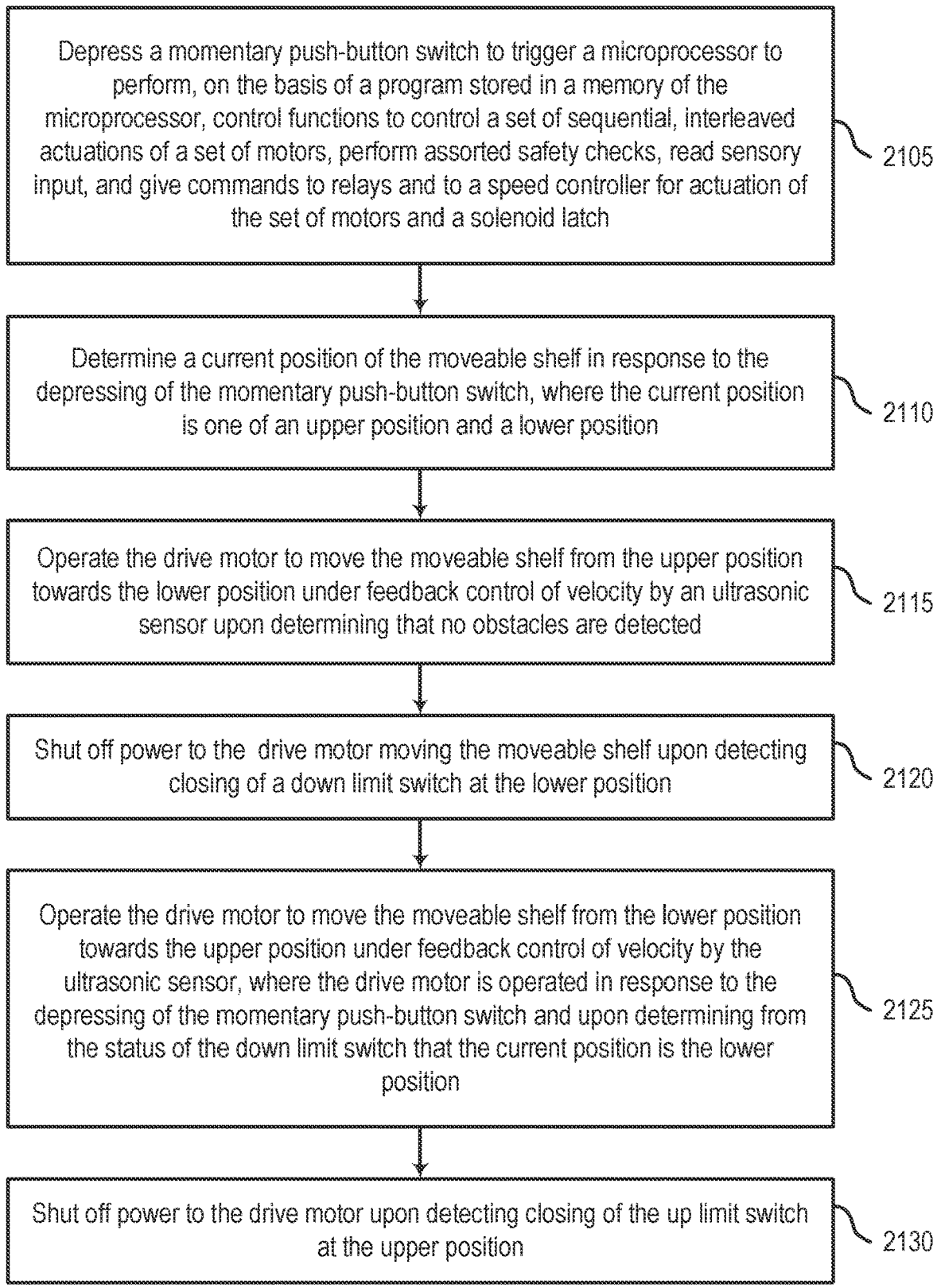
FIG. 21 shows an operational flowchart for an elevator shelf executing up/down motion only according to aspects of the present disclosure.

FIG. 21 shows an example method 2100 for executing up/down movements only of shelf systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2105, the user depresses a momentary push-button switch to trigger a microprocessor to perform, on the basis of a program stored in a memory of the microprocessor, control functions to control a set of sequential, interleaved actuations of a set of motors, perform assorted safety checks, read sensory input, and give commands to relays and to a speed controller for actuation of the set of motors and a solenoid latch. In some cases, the operations of this step refer to, or may be performed by, a momentary push-button switch as described in more detail herein.

At operation 2110, the system determines a current position of the moveable shelf in response to the depressing of the momentary push-button switch, where the current position is one of an upper position and a lower position. In some cases, the operations of this step refer to, or may be performed by, a shelf as described with reference to at least FIGS. 5, 7, 10, 11, and 15-20.

At operation 2115, the system operates the drive motor to translate the moveable shelf from the upper position towards the lower position under feedback control of velocity by an ultrasonic sensor upon determining that no obstacles are detected. In some cases, the operations of this step refer to, or may be performed by, a motor as described with reference to at least FIGS. 2, 12, and 18.

At operation 2120, the system shuts off power to the drive motor moving the moveable shelf upon detecting closing of a down limit switch at the lower position. In some cases, the operations of this step refer to, or may be performed by, a motor as described with reference to at least FIGS. 2, 12, and 18.

At operation 2125, the system operates the drive motor to move the moveable shelf from the lower position towards the upper position under feedback control of velocity by the ultrasonic sensor, where the drive motor is operated in response to the depressing of the momentary push-button switch and upon determining from the status of the down limit switch that the current position is the lower position. In some cases, the operations of this step refer to, or may be performed by, a motor as described with reference to at least FIGS. 2 and 18.

At operation 2130, the system shuts off power to the drive motor upon detecting closing of the up limit switch at the upper position. In some cases, the operations of this step refer to, or may be performed by, a motor as described with reference to at least FIGS. 2 and 18.

Figure 22A:
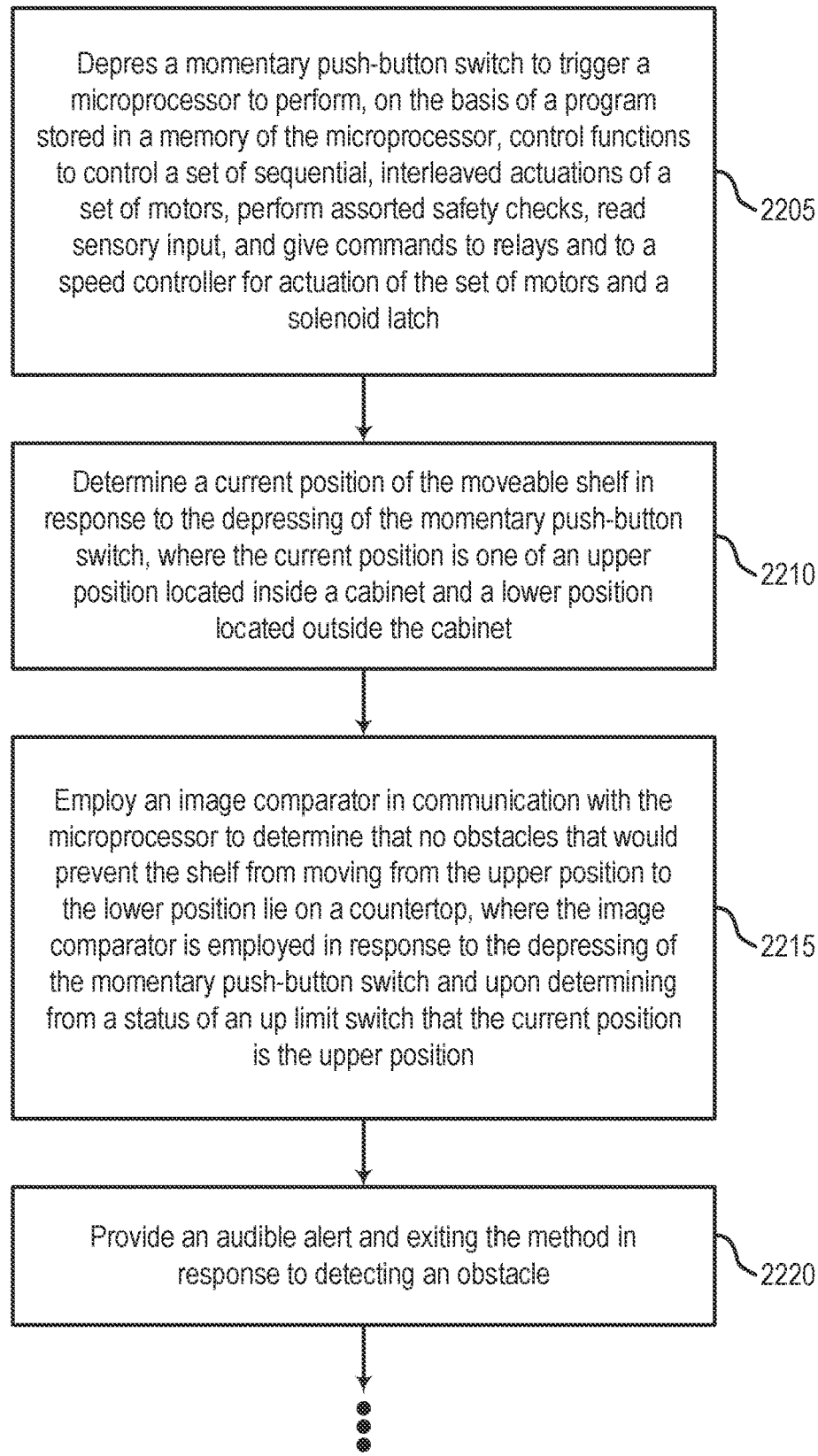
FIGS. 22A, 22B, and 22C show an operational flowchart for an elevator shelf executing in/out and up/down motions as well as safety checks and release of the axle lock according to aspects of the present disclosure.
Figure 22B:
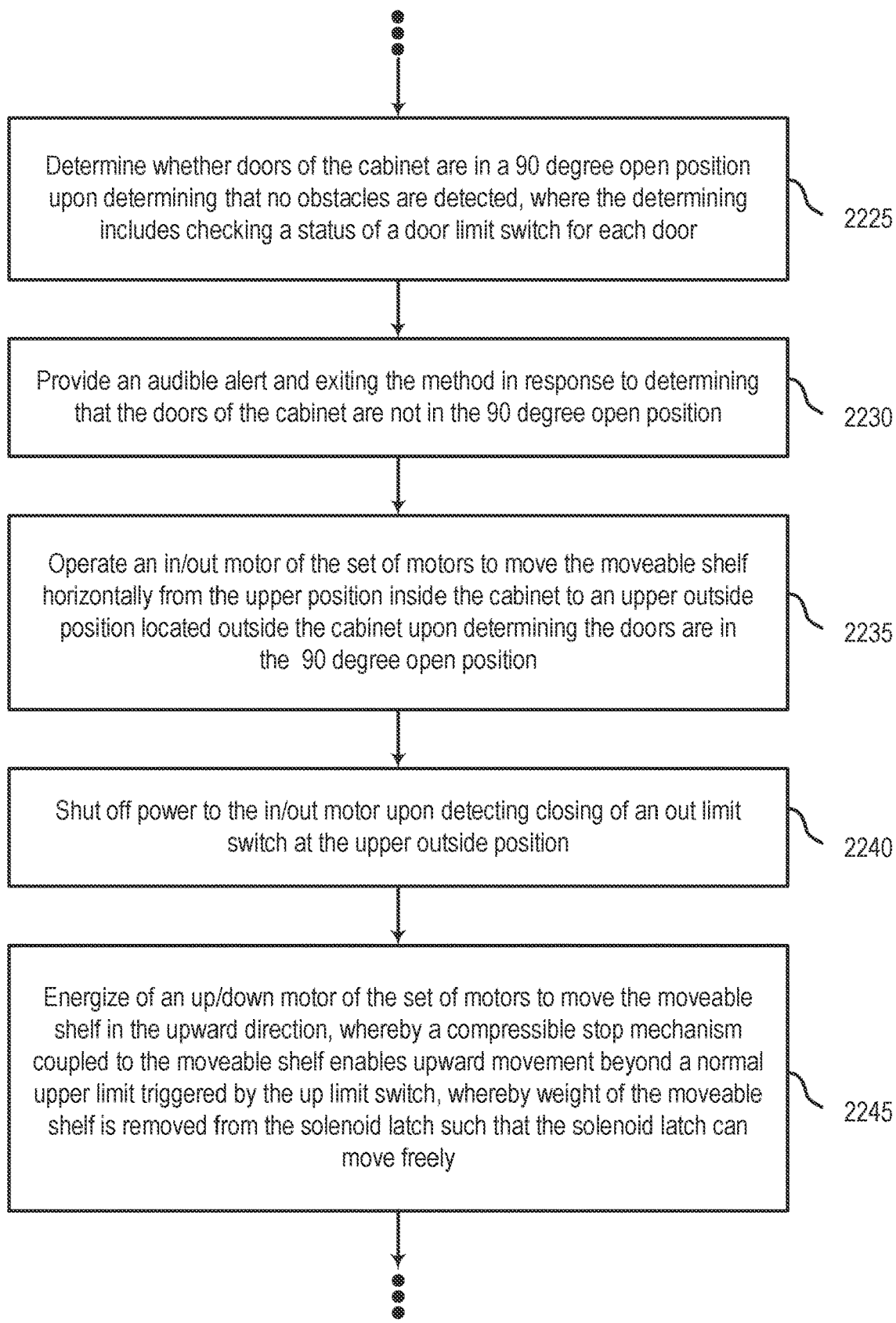
Figure 22C:
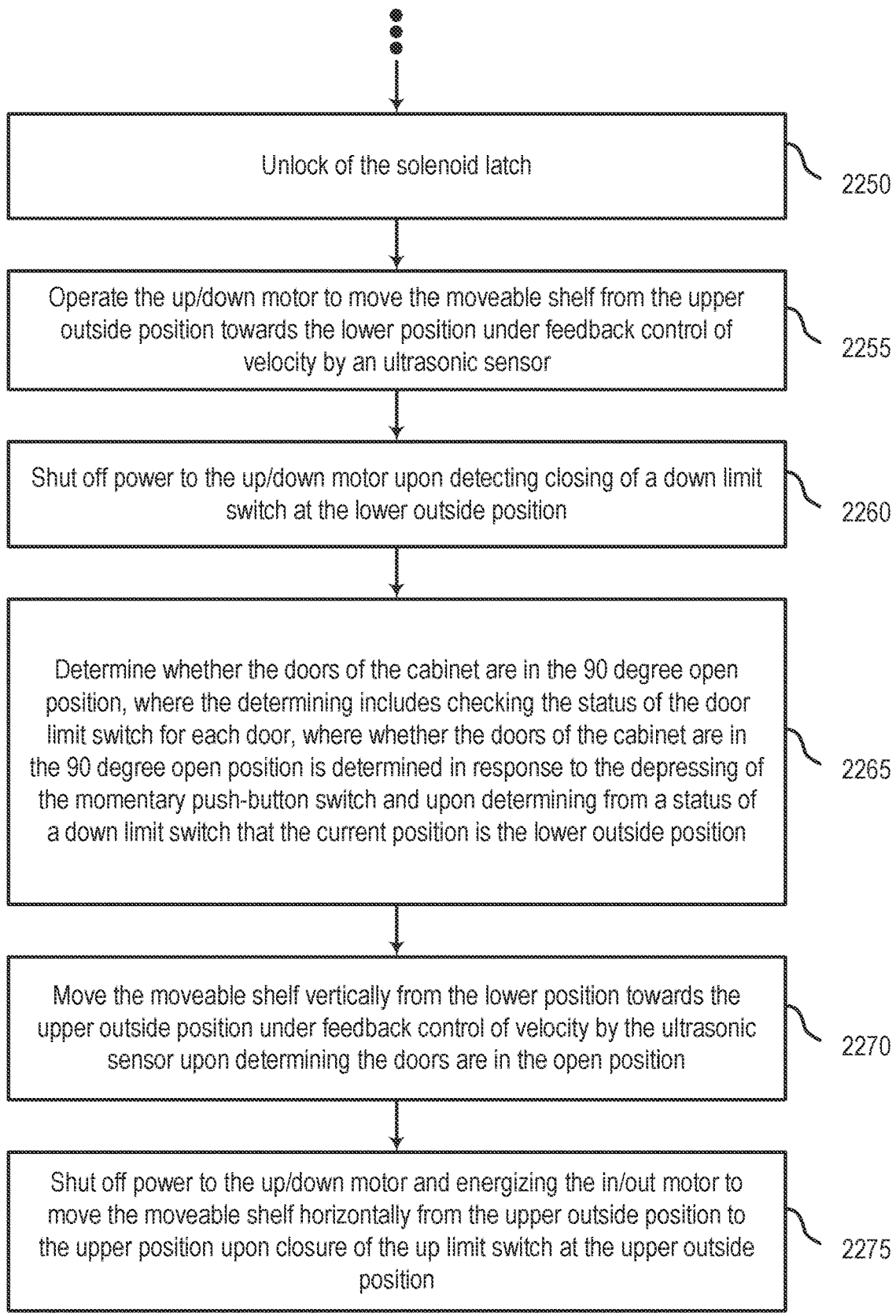

FIGS. 22A, 22B, and 22C show an example method 2200 for shelf systems executing both in/out and up/down movements according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2205, the user depresses a momentary push-button switch to trigger a microprocessor to perform, on the basis of a program stored in a memory of the microprocessor, control functions to control a set of sequential, interleaved actuations of a set of motors, perform assorted safety checks, read sensory input, and give commands to relays and to a speed controller for actuation of the set of motors and a solenoid latch. In some cases, the operations of this step refer to, or may be performed by, a momentary push-button switch as described in more detail herein.

At operation 2210, the system determines a current position of the moveable shelf in response to the depressing of the momentary push-button switch, where the current position is one of an upper position located inside a cabinet and a lower position located outside the cabinet. In some cases, the operations of this step refer to, or may be performed by, a shelf as described with reference to at least FIGS. 5, 7, 10, 11, and 15-20.

At operation 2215, the system employs an image comparator in communication with the microprocessor to determine that no obstacles that would prevent the shelf from moving from the upper position to the lower position lie on a countertop, where the image comparator is employed in response to the depressing of the momentary push-button switch and upon determining from a status of an up limit switch that the current position is the upper position. In some cases, the operations of this step refer to, or may be performed by, a camera as described with reference to at least FIG. 8.

At operation 2220, the system provides an audible alert and exiting the method in response to detecting an obstacle. In some cases, the operations of this step refer to, or may be performed by, a speaker as described in more detail herein.

At operation 2225, the system determines whether doors of the cabinet are in a 90 degree open position upon determining that no obstacles are detected, where the determining includes checking a status of a door limit switch for each door. In some cases, the operations of this step refer to, or may be performed by, a microprocessor as described in more detail herein.

At operation 2230, the system provides an audible alert and exits the method in response to determining that the doors of the cabinet are not in the 90 degree open position. In some cases, the operations of this step refer to, or may be performed by, a speaker as described in more detail herein.

At operation 2235, the system operates an in/out motor of the set of motors to move the moveable shelf horizontally from the upper position inside the cabinet to an upper outside position located outside the cabinet upon determining the doors are in the 90 degree open position. In some cases, the operations of this step refer to, or may be performed by, a motor as described with reference to at least FIGS. 1 and 12.

At operation 2240, the system shuts off power to the in/out motor upon detecting closing of an out limit switch at the upper outside position. In some cases, the operations of this step refer to, or may be performed by, a motor as described with reference to at least FIG. 1.

At operation 2245, the system energizes of an up/down motor of the set of motors to move the moveable shelf in the upward direction, whereby a compressible stop mechanism coupled to the moveable shelf enables upward movement beyond a normal upper limit triggered by the up limit switch, whereby weight of the moveable shelf is removed from the solenoid latch such that the solenoid latch can move freely. In some cases, the operations of this step refer to, or may be performed by, a motor as described with reference to at least FIG. 2.

At operation 2250, the system unlocks the solenoid latch. In some cases, the operations of this step refer to, or may be performed by, a solenoid door latch as described with reference to at least FIGS. 2 and 3.

At operation 2255, the system operates the up/down motor to move the moveable shelf from the upper outside position towards the lower position under feedback control of velocity by an ultrasonic sensor. In some cases, the operations of this step refer to, or may be performed by, a shelf as described with reference to at least FIGS. 5, 7, 10, and 11.

At operation 2260, the system shuts off power to the up/down motor upon detecting closing of a down limit switch at the lower outside position. In some cases, the operations of this step refer to, or may be performed by, a motor as described with reference to at least FIGS. 1, 12, and 18.

At operation 2265, the system determines whether the doors of the cabinet are in the 90 degree open position, where the determining includes checking the status of the door limit switch for each door, where whether the doors of the cabinet are in the 90 degree open position is determined in response to the depressing of the momentary push-button switch and upon determining from a status of a down limit switch that the current position is the lower outside position. In some cases, the operations of this step refer to, or may be performed by, doors as described in more detail herein.

At operation 2270, the system moves the moveable shelf vertically from the lower position towards the upper outside position under feedback control of velocity by the ultrasonic sensor upon determining the doors are in the open position. In some cases, the operations of this step refer to, or may be performed by, a shelf as described with reference to at least FIGS. 5, 7, 10, and 11.

At operation 2275, the system shuts off power to the up/down motor and energizes the in/out motor to move the moveable shelf horizontally from the upper outside position to the upper inside position upon closure of the up limit switch at the upper outside position. In some cases, the operations of this step refer to, or may be performed by, a motor as described with reference to at least FIG. 1.

Accordingly, the present disclosure includes the following aspects.

Apparatuses, systems, and methods for configuration and control of moveable shelf systems is described. One or more aspects of the apparatuses, systems, and methods include a control board assembly comprising a control board housing, at least four reels, a drive motor, a microprocessor, a solenoid latch, a plurality of relays, a speed controller, and a fuse box; a moveable shelf hanging below the control board assembly from four belts wherein a first end of each belt is wrapped around one reel and a second end of each belt is coupled to the moveable shelf; an up limit switch mounted to the anti-sway rod affixed to the bottom of control board; a down limit switch mounted to an underside of the moveable shelf; an ultrasonic sensor mounted to the moveable shelf; an electrical connection between the microprocessor and both the down limit switch and the ultrasonic sensor comprising a 6-wire ribbon cable; and a push button switch coupled to the microprocessor.

In some aspects, the drive motor, the microprocessor, the solenoid latch, the speed controller, and the fuse box are mounted to the control board housing.

In some aspects, the at least four reels are housed by the control board housing and are rigidly attached to substantially horizontal axles which rotate in bearings, and a first pair of reels is mounted such as to rotate around parallel axes and a second pair of reels is mounted such as to rotate around axes perpendicular to the axles of the first pair.

In some aspects, the drive motor is configured for simultaneous rotation of the at least four reels by turning the axles to which the reels are fixed.

In some aspects, the solenoid latch is controlled by the microprocessor such that when the latch engages teeth of a gear fixed to one axle, the axle is locked, whereby downward motion of the shelf is prevented when electrical power to the drive motor is absent.

In some aspects, the speed controller is controlled by the microprocessor and wherein an output of the speed controller is connected to the drive motor.

In some aspects, the reel rotational axes result in a first pair of belts coupled to the first pair of reels being orthogonal to a second pair of belts coupled to the second pair of reels, and whereby the orthogonal planes of the belts inhibit swaying of the shelf in the fore, aft, left, and right positions when the shelf is moved vertically.

In some aspects, the moveable shelf system is further configured to move the moveable shelf between an upper position and a lower position by the simultaneous rotating of the four reels, the shelf further comprising a plurality of rubber feet mounted to an underside of the moveable shelf, the shelf further supporting a compressible step mechanism mounted to the shelf, wherein the compressible stop mechanism contains a spring stiffer than a spring in an up limit switch.

In some aspects, the up limit switch is in communication with the microprocessor such that a status of the up limit switch is sensed by the microprocessor and contact of the up limit switch with the compressible stop mechanism causes the moveable shelf to stop at the upper position, and where the down limit switch is in communication with the microprocessor such that a status of the down limit switch is sensed by the microcontroller.

In some aspects, the multi-wire ribbon cable is folded twice so as to slip into a slot cut across the wrapping surface of the reel and locked in place by a washer separating the two side-by-side wrappings of the cable around the reel. The cable leg to the shelf is held taut by virtue of the reel winding or unwinding the cable as the shelf moves up and down, respectively, and the cable leg to the control board is held taut by a constant force coil spring pulling the cable into a V shape. The moveable shelf stops at the lower position in response to closure of the down limit switch at the lower position, wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion.

In some aspects, the at least one additional electrical connection is of variable length and similar to the down limit switch-microprocessor electrical connection, and where the at least one additional electrical connection is between an ultrasonic sensor mounted on the underside of the moveable shelf and the microprocessor on the control board via a multi-wire ribbon cable wrapped around a hex-bore reel, wherein the ultrasonic sensor is configured to measure the distance between shelf and a countertop located below the shelf at regular fixed time intervals and, thereby, provides a real time monitor of vertical velocity with which the microcontroller can exercise feedback control of the acceleration of the shelf up to a target cruising velocity and deceleration back to rest as the shelf approaches a lower or upper terminus of its vertical trajectory.

In some aspects, the momentary depression of the push button switch triggers the movement of the shelf between the upper and lower positions by causing the microprocessor to initiate a sequence of commands to the plurality of relays and the speed controller such that when the shelf is in the upper position, depression of the push button switch causes the shelf to descend to the lower position, and when the shelf is in the lower position, depression of the push button switch causes the shelf to ascend to the upper position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

In some aspects, the control board assembly is mounted to a horizontal support structure.

In some aspects, the horizontal support surfaces comprise a pair of exposed joists in a garage with an open ceiling.

In some aspects, the control board assembly is mounted to a slanted support structure.

In some aspects, the slanted support structure comprises one of a pair of roof rafters in a garage having an open ceiling, and a crawl space between a house roof and an access hole in a ceiling below the crawl space.

In some aspects, the control board assembly is mounted to an interior of a cabinet via drawer slides such that the control board assembly is moveable horizontally from a first horizontal position inside the cabinet and a second horizontal position outside the cabinet.

In some aspects, the control board housing comprises a box with a height less than 3 inches and a width and depth comparable with a moveable shelf hanging from the control board housing.

Some examples of the apparatuses, systems, and methods described herein further include a second motor mounted to the control board housing and coupled to a means for horizontal movement, wherein the second motor is configured to drive the control board housing between the first horizontal position and the second horizontal position.

In some aspects, the shelf further supports a compressible stop mechanism mounted to the shelf, wherein the compressible stop contains a spring stiffer than a spring in an up limit switch and the moveable shelf further comprises a fence on the sides and back of the moveable shelf.

Some examples of the apparatuses, systems, and methods described herein further include a hinged lightweight horizontal roof mounted to the belts at a location above the moveable shelf configured to show a safe vertical height of loaded objects between the moveable shelf and the control board housing when the moveable shelf is in the upper position.

Some examples of the apparatuses, systems, and methods described herein further include an anti-sway rod coupled to the control board housing and extending downward from the control board housing, wherein when the moveable shelf is in the upper position a lower end of the anti-sway rod is removably receivable by a receptacle coupled to an upper surface of the moveable shelf, whereby when the moveable shelf is in the upper position the anti-sway rod is received in the receptacle, whereby a rigid connection is formed between the control board housing and the moveable shelf that prevents in/out rocking of the shelf caused by horizontal movement of the control board, wherein during descent of the moveable shelf the anti-sway rod automatically detaches from the receptacle, whereby the anti-sway rod is detached from the moveable shelf.

In some aspects, when the shelf is in the upper position and inside the cabinet, depression of the push button switch causes the shelf to first move horizontally outward to the second horizontal position and then descend to the lower position, and when the shelf is in the lower position, depression of the push button switch causes the shelf to first ascend to the upper position and then move inward to the first horizontal position, wherein the microprocessor is further configured to, when the shelf is in the upper position and prior to commencing downward motion, send a command to the drive motor to raise the shelf a distance beyond a stop set by the u[ limit switch while simultaneously actuating the solenoid to unlock the axle.

In some aspects, the moveable shelf comprises a single shelf installed in a location selected from the group of those high up in an over-the-counter kitchen cabinet, in a clothes closet, and in a kitchen pantry.

In some aspects, the moveable shelf comprises a multi-shelf pantry assembly, the moveable shelf system further including a plurality of vertical pins extending downward the from a backside of the multi-shelf pantry assembly, wherein each pin is received in a corresponding hole of a horizontal bar attached to an inside of the door of the cabinet, causing the moveable shelf to be rigidly locked against movement when the multi-shelf pantry assembly is in the lower position.

In some aspects, the moveable shelf system comprises two shelves arranged one behind the other over a tall, deep object, with each of the two shelves equipped with one side of a vertical scissors jack, wherein two crossed arms forming the side of each scissors jack are outfitted with horizontal slotted bars and a pin protruding into each slot from a pivot point at the front end of each arm, whereby the slot ends in the horizontal bars act as stops which rigidly lock each shelf against movement when that shelf is in its lower position.

In some aspects, the four or more reels are attached to substantially horizontal and parallel axles which rotate in bearings.

A method, apparatus, non-transitory computer readable medium, and system for configuration and control of moveable shelf systems is described. One or more aspects of the method, apparatus, non-transitory computer readable medium, and system include depressing a momentary push-button switch to trigger a microprocessor to perform, on the basis of a program stored in a memory of the microprocessor, control functions to control a plurality of sequential, interleaved actuations of a plurality of motors, perform assorted safety checks, read sensory input, and give commands to relays and to a speed controller for actuation of the plurality of motors and a solenoid latch; determining a current position of the moveable shelf in response to the depressing of the momentary push-button switch, wherein the current position is one of an upper position and a lower position; operating the drive motor to move the moveable shelf from the upper position towards the lower position under feedback control of velocity by an ultrasonic sensor upon determining that no obstacles are detected; shutting off power to the drive motor moving the moveable shelf upon detecting closing of a down limit switch at the lower position; operating the drive motor to move the moveable shelf from the lower position towards the upper position under feedback control of velocity by the ultrasonic sensor, wherein the drive motor is operated in response to the depressing of the momentary push-button switch and upon determining from the status of the down limit switch that the current position is the lower position; and shutting off power to the drive motor upon detecting closing of the up limit switch at the upper position.

A method, apparatus, non-transitory computer readable medium, and system for configuration and control of moveable shelf systems is described. One or more aspects of the method, apparatus, non-transitory computer readable medium, and system include depressing a momentary push-button switch to trigger a microprocessor to perform, on the basis of a program stored in a memory of the microprocessor, control functions to control a plurality of sequential, interleaved actuations of a plurality of motors, perform assorted safety checks, read sensory input, and give commands to relays and to a speed controller for actuation of the plurality of motors and a solenoid latch; determining a current position of the moveable shelf in response to the depressing of the momentary push-button switch, wherein the current position is one of an upper position located inside a cabinet and a lower position located outside the cabinet; employing an image comparator in communication with the microprocessor to determine that no obstacles that would prevent the shelf from moving from the upper position to the lower position lie on a countertop, wherein the image comparator is employed in response to the depressing of the momentary push-button switch and upon determining from a status of an up limit switch that the current position is the upper position; providing an audible alert and exiting the method in response to detecting an obstacle; determining whether doors of the cabinet are in a 90 degree open position upon determining that no obstacles are detected, wherein the determining includes checking a status of a door limit switch for each door; providing an audible alert and exiting the method in response to determining that the doors of the cabinet are not in the 90 degree open position; operating an in/out motor of the plurality of motors to move the moveable shelf horizontally from the upper position inside the cabinet to an upper outside position located outside the cabinet upon determining the doors are in the 90 degree open position; shutting off power to the in/out motor upon detecting closing of an out limit switch at the upper outside position; energizing of an up/down motor of the plurality of motors to move the moveable shelf in the upward direction, whereby a compressible stop mechanism coupled to the moveable shelf enables upward movement beyond a normal upper limit triggered by the up limit switch, whereby weight of the moveable shelf is removed from the solenoid latch such that the solenoid latch can move freely; unlocking of the solenoid latch; operating the up/down motor to move the moveable shelf from the upper outside position towards the lower position under feedback control of velocity by an ultrasonic sensor; shutting off power to the up/down motor upon detecting closing of a down limit switch at the lower outside position; determining whether the doors of the cabinet are in the 90 degree open position, wherein the determining includes checking the status of the door limit switch for each door, wherein whether the doors of the cabinet are in the 90 degree open position is determined in response to the depressing of the momentary push-button switch and upon determining from a status of a down limit switch that the current position is the lower outside position; moving the moveable shelf vertically from the lower position towards the upper outside position under feedback control of velocity by the ultrasonic sensor upon determining the doors are in the open position; and shutting off power to the up/down motor and energizing the in/out motor to move the moveable shelf horizontally from the upper outside position to the upper position upon closure of the up limit switch at the upper outside position.

Some examples of the method, apparatus, non-transitory computer readable medium, and system further include activating a door motor of the plurality of motors, wherein the door motor is operatively coupled to the doors to open the doors to the 90 degree open position upon determining that the doors of the cabinet are not in the 90 degree open position.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A moveable shelf system with capability for vertical motion only, comprising:
   a control board assembly mounted to a horizontal support structure and comprising:
      a control board housing;
      at least four reels housed by the control board housing and rigidly attached to substantially horizontal axles which rotate in bearings, wherein a first pair of reels is mounted such as to rotate around parallel axes and a second pair of reels is mounted such as to rotate around axes perpendicular to the axles of the first pair;
   a drive motor mounted to the control board housing and configured for simultaneous rotation of the at least four reels by turning the axles to which the reels are fixed;
   a microprocessor mounted to the control board housing;
      a solenoid latch mounted to the control board housing and controlled by the microprocessor such that when the latch engages teeth of a gear fixed to one axle, the axle is locked, whereby downward motion of the shelf is prevented when electrical power to the drive motor is absent;
      a plurality of relays;
      a speed controller mounted to the control board housing and controlled by the microprocessor and wherein an output of the speed controller is connected to the drive motor; and
      a fuse box mounted to the control board housing;
   a moveable shelf hanging below the control board assembly from four belts wherein a first end of each belt is wrapped around one reel and a second end of each belt is coupled to the moveable shelf, whereby the reel rotational axes result in a first pair of belts coupled to the first pair of reels being orthogonal to a second pair of belts coupled to the second pair of reels, whereby the orthogonal planes of the belts inhibit swaying of the shelf in the fore, aft, left, and right positions when the shelf is moved vertically, wherein the system is further configured to move the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop mechanism contains a spring stiffer than a spring in an up limit switch;
   the up limit switch mounted to the control board and in communication with the microprocessor such that a status of the up limit switch is sensed by the microprocessor and contact of the up limit switch with the compressible stop mechanism causes the moveable shelf to stop at the upper position;
   a down limit switch in communication with the microprocessor such that a status of the down limit switch is sensed by the microprocessor,
   wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion;
   at least one sensor coupled to the microprocessor, wherein the at least one sensor provides a real time monitor of vertical velocity with which the microprocessor can exercise feedback control of the acceleration of the shelf up to a target cruising velocity and deceleration back to rest as the shelf approaches a lower or upper terminus of its vertical trajectory;

a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position, depression of the push button switch causes the shelf to descend to the lower position, and when the shelf is in the lower position, depression of the push button switch causes the shelf to ascend to the upper position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

2. The moveable shelf system with capability for vertical motion only of claim 1, wherein the horizontal support structure comprises a pair of exposed joists in a garage with an open ceiling.

3. A moveable shelf system with capability for vertical motion only, comprising:
 a control board assembly mounted to a slanted support structure and comprising:
  a control board housing;
  four or more reels contained in the control board housing and attached to substantially horizontal and parallel axles which rotate in bearings;
  a drive motor mounted to the control board housing and configured for simultaneous rotation of the four or more reels by turning the axles to which the reels are fixed;
  a microprocessor mounted to the control board housing;
   a solenoid latch mounted to the control board housing and controlled by the microprocessor such that when the latch engages teeth of a gear fixed to one axle, the axle is locked, whereby downward motion of the shelf is prevented when electrical power to the drive motor is absent;
   a plurality of relays;
   a speed controller mounted to the control board housing and controlled by the microprocessor and wherein an output of the speed controller is connected to the drive motor; and
   a fuse box mounted to the control board housing;
 a moveable shelf hanging below the control board assembly from four belts wherein a first end of each belt is wrapped around one reel and a second end of each belt is coupled to the moveable shelf, wherein the system is further configured to move the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop mechanism contains a spring stiffer than a spring in an up limit switch;
 the up limit switch mounted to the control board and in communication with the microprocessor such that a status of the up limit switch is sensed by the microprocessor and contact of the up limit switch with the compressible stop mechanism causes the moveable shelf to stop at the upper position;
 a down limit switch in communication with the microprocessor such that a status of the down limit switch is sensed by the microprocessor,
 wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion;
 at least one sensor coupled to the microprocessor, wherein the at least one sensor provides a real time monitor of vertical velocity with which the microprocessor can exercise feedback control of the acceleration of the shelf up to a target cruising velocity and deceleration back to rest as the shelf approaches a lower or upper terminus of its vertical trajectory; and
 a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position, depression of the push button switch causes the shelf to descend to the lower position, and when the shelf is in the lower position, depression of the push button switch causes the shelf to ascend to the upper position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

4. The moveable shelf system with capability for vertical motion only of claim 3, wherein the slanted support structure comprises one of a pair of roof rafters in a garage having an open ceiling, and a crawl space between a house roof and an access hole in a ceiling below the crawl space.

5. A moveable shelf system with capability for both horizontal and vertical motion, comprising:
 a control board assembly mounted to an interior of a cabinet via drawer slides such that the control board assembly is moveable horizontally from a first horizontal position inside the cabinet and a second horizontal position outside the cabinet, and comprising:
  a control board housing comprising a box with a height less than 3 inches and a width and depth comparable with a moveable shelf hanging from the control board housing;
  four or more reels inside the control board housing and rigidly attached to substantially horizontal axles which rotate in bearings, wherein a first pair of reels is mounted such as to rotate around parallel axes and the second pair of reels is mounted such as to rotate around axes perpendicular to the axles of the first pair;
  a drive motor mounted to the control board housing and configured for simultaneous rotation of the four reels by turning the axles to which the reels are fixed;
  a microprocessor mounted to the control board housing;
   a solenoid latch mounted to the control board housing and controlled by the microprocessor such that when the latch engages teeth of a gear fixed to one axle, the axle is locked, whereby downward motion of the shelf is prevented when electrical power to the drive motor is absent;

a plurality of relays;

a speed controller mounted to the control board housing and controlled by the microprocessor and wherein an output of the speed controller is connected to the drive motor;

a fuse box mounted to the control board housing;

a second motor mounted to the control board housing and coupled to a means for horizontal movement, wherein the second motor is configured to drive the control board housing between the first horizontal position and the second horizontal position;

a moveable shelf hanging below the control board assembly, from four or more belts wherein a first end of each belt is wrapped around one reel and a second end of each belt is coupled to the moveable shelf, whereby the reel rotational axes result in a first pair of belts coupled to the first pair of reels being orthogonal to a second pair of belts coupled to the second pair of reels, whereby the orthogonal planes of the belts inhibit swaying of the shelf in the fore, aft, left, and right positions when the shelf is moved vertically, wherein the system is further configured to move the moveable shelf between an upper position and a lower position by the simultaneous rotating of the four reels, the shelf further comprising a plurality of rubber feet mounted to an underside of the moveable shelf, the shelf further supporting a compressible stop mechanism mounted to the shelf, wherein the compressible stop contains a spring stiffer than a spring in an up limit switch, the moveable shelf further comprising a fence on the sides and back of the moveable shelf;

a hinged lightweight horizontal roof mounted to the belts at a location above the moveable shelf configured to show a safe vertical height of loaded objects between the moveable shelf and the control board housing when the moveable shelf is in the upper position;

an anti-sway rod coupled to the control board housing and extending downward from the control board housing, wherein when the moveable shelf is in the upper position a lower end of the anti-sway rod is removably receivable by a receptacle coupled to an upper surface of the moveable shelf, whereby when the moveable shelf is in the upper position the anti-sway rod is received in the receptacle, whereby a rigid connection is formed between the control board housing and the moveable shelf that prevents in/out rocking of the shelf caused by horizontal movement of the control board, wherein during descent of the moveable shelf the anti-sway rod automatically detaches from the receptacle, whereby the anti-sway rod is detached from the moveable shelf, the up limit switch mounted to the control board and in communication with the microprocessor such that a status of the up limit switch is sensed by the microprocessor and contact of the up limit switch with the compressible stop mechanism causes the moveable shelf to stop at the upper position;

a down limit switch in communication with the microprocessor such that a status of the down limit switch is sensed by the microprocessor, wherein moving from the upper position to the lower position further includes the microprocessor sending a command to the drive motor to raise the shelf a distance smaller than a stroke of the spring of the compressible stop mechanism while simultaneously actuating the solenoid latch to unlock the drive axle, then sending a command to the drive motor to commence downward motion;

at least one sensor coupled to the microprocessor, wherein the at least one sensor provides a real time monitor of vertical velocity with which the microprocessor can exercise feedback control of the acceleration of the shelf up to a target cruising velocity and deceleration back to rest as the shelf approaches a lower or upper terminus of its vertical trajectory; and a push button switch coupled to the microprocessor, whereby momentary depression of the push button switch triggers the movement of the shelf between the upper and lower positions by causing the microprocessor to initiate a sequence of commands to the plurality of relays and the speed controller such that when the shelf is in the upper position and inside the cabinet, depression of the push button switch causes the shelf to first move horizontally outward to the second horizontal position and then descend to the lower position, and when the shelf is in the lower position, depression of the push button switch causes the shelf to first ascend to the upper position and then move inward to the first horizontal position, wherein the microprocessor is further configured to, when the shelf is in the upper position and prior to commencing downward motion, send a command to the drive motor to raise the shelf a distance beyond a stop set by the up limit switch while simultaneously actuating the solenoid to unlock the axle.

6. The moveable shelf system with capability for both horizontal and vertical motion of claim 5, wherein the moveable shelf comprises a single shelf installed in a location selected from the group of high up in an over-the-counter kitchen cabinet, in a clothes closet, and in a kitchen pantry.

7. The moveable shelf system with capability for both horizontal and vertical motion of claim 5, wherein the moveable shelf comprises a multi-shelf pantry assembly, the moveable shelf system further including a plurality of vertical pins extending downward the from a backside of the multi-shelf pantry assembly, wherein each pin is received in a corresponding hole of a horizontal bar attached to an inside of a door of the cabinet, causing the moveable shelf to be rigidly locked against movement when the multi-shelf pantry assembly is in the lower position.

8. The moveable shelf system with capability for both horizontal and vertical motion of claim 5, wherein the moveable shelf system comprises two shelves arranged one behind the other over a tall, deep object, with each of the two shelves equipped with one side of a vertical scissors jack, wherein two crossed arms forming the side of each scissors jack are outfitted with horizontal slotted bars and a pin protruding into each slot from a pivot point at the front end of each arm, whereby the slot ends in the horizontal bars act as stops which rigidly lock each shelf against movement when that shelf is in its lower position.

9. A method for controlling the operation of a moveable shelf for both vertical and horizontal movement, which entails on the part of a user a sole action of depressing a momentary push-button, comprising the steps of:

depressing a momentary push-button switch to trigger a microprocessor to perform, on the basis of a program stored in a memory of the microprocessor, control functions to control a plurality of sequential, interleaved actuations of a plurality of motors, perform assorted safety checks, read sensory input, and give commands to relays and to a speed controller for actuation of the plurality of motors and a solenoid latch;

in response to the depressing of the momentary push-button switch, determining a current position of the moveable shelf, wherein the current position is one of an upper position located inside a cabinet and a lower position located outside the cabinet;

in response to the depressing of the momentary push-button switch, upon determining from a status of an up limit switch that the current position is the upper position, employing an image comparator in communication with the microprocessor to determine that no obstacles that would prevent the shelf from moving from the upper position to the lower position lie on a countertop;

in response to detecting an obstacle, providing an audible alert and exiting the method;

upon determining that no obstacles are detected, determining whether doors of the cabinet are in a 90 degree open position, wherein the determining includes checking a status of a door limit switch for each door;

in response to determining that the doors of the cabinet are not in the 90 degree open position, providing an audible alert and exiting the method;

upon determining the doors are in the 90 degree open position, operating an in/out motor of the plurality of motors to move the moveable shelf horizontally from the upper position inside the cabinet to an upper outside position located outside the cabinet;

upon detecting closing of an out limit switch at the upper outside position, shutting off power to the in/out motor;

energizing of an up/down motor of the plurality of motors to move the moveable shelf in the upward direction, whereby a compressible stop mechanism coupled to the moveable shelf enables upward movement beyond a normal upper limit triggered by the up limit switch, whereby weight of the moveable shelf is removed from the solenoid latch such that the solenoid latch can move freely;

unlocking of the solenoid latch;

operating the up/down motor to move the moveable shelf from the upper outside position towards the lower position under feedback control of velocity by a sensor;

upon detecting closing of a down limit switch at the lower outside position, shutting off power to the up/down motor;

in response to the depressing of the momentary push-button switch, upon determining from a status of a down limit switch that the current position is the lower outside position, determining whether the doors of the cabinet are in the 90 degree open position, wherein the determining includes checking the status of the door limit switch for each door;

upon determining the doors are in the open position, moving the moveable shelf vertically from the lower position towards the upper outside position under feedback control of velocity by the sensor; and upon closure of the up limit switch at the upper outside position, shutting off power to the up/down motor and energizing the in/out motor to move the moveable shelf horizontally from the upper outside position to the upper position.

10. The method for controlling the operation of the moveable shelf for vertical and horizontal movement of claim 9, wherein handles of the cabinet doors are located higher than a predetermined height, further comprising the step of:

upon determining that the doors of the cabinet are not in the 90 degree open position, activating a door motor of the plurality of motors, wherein the door motor is operatively coupled to the doors to open the doors to the 90 degree open position.

\* \* \* \* \*

UNITED STATES PATENT AND TRADEMARK OFFICE
CERTIFICATE OF CORRECTION

| | | |
|---|---|---|
| PATENT NO. | : 11,771,220 B1 | Page 1 of 1 |
| APPLICATION NO. | : 17/691686 | |
| DATED | : October 3, 2023 | |
| INVENTOR(S) | : Brooks | |

It is certified that error appears in the above-identified patent and that said Letters Patent is hereby corrected as shown below:

In the Claims
Claim 5, Column 33, Line 53, delete "shelf," and insert --shelf;--.
Claim 7, Column 34, Line 41, delete "the from a" and insert --from a--.

Signed and Sealed this
Twenty-first Day of November, 2023

Katherine Kelly Vidal
*Director of the United States Patent and Trademark Office*